United States Patent
Fujimoto

(10) Patent No.: US 8,351,160 B2
(45) Date of Patent: Jan. 8, 2013

(54) MAGNETIC HEAD SUSPENSION UTILIZING LAMINATE CONDUCTOR CONNECTING PIEZOELECTRIC ELEMENTS VIA FIRST AND SECOND CONNECTING OPENINGS IN THE LAMINATE

(75) Inventor: Yasuo Fujimoto, Kyoto-fu (JP)

(73) Assignee: Suncall Corporation, Kyoto-Fu (JP)

( * ) Notice: Subject to any disclaimer, the term of this patent is extended or adjusted under 35 U.S.C. 154(b) by 55 days.

(21) Appl. No.: 13/106,594

(22) Filed: May 12, 2011

(65) Prior Publication Data
US 2011/0292550 A1 Dec. 1, 2011

(30) Foreign Application Priority Data
May 13, 2010 (JP) .................................. 2010-110806

(51) Int. Cl.
*G11B 5/55* (2006.01)
*G11B 5/56* (2006.01)
(52) U.S. Cl. ................. 360/245.8; 310/323.06; 310/363; 310/364; 310/365; 360/245.9; 360/294.4
(58) Field of Classification Search ....... 360/245.8–246, 360/264.2, 294.4; 310/323.06, 363–366
See application file for complete search history.

(56) References Cited

U.S. PATENT DOCUMENTS
2008/0229842 A1* 9/2008 Ohtsuka et al. ................. 73/777
2010/0165515 A1* 7/2010 Ando ............................ 360/290

FOREIGN PATENT DOCUMENTS
| JP | 2000-298812 | 10/2000 |
| JP | 2002-251854 | 9/2002 |
| JP | 2009-080915 A | 4/2009 |
| JP | 2010-086649 | 4/2010 |

OTHER PUBLICATIONS

The Notification of Reason(s) for Rejection for related Japanese Appl. No. 2010-110806, Japanese Patent Office, mailed Apr. 27, 2012, 4 pgs.

* cited by examiner

*Primary Examiner* — Allen Heinz
(74) *Attorney, Agent, or Firm* — Sterne, Kessler, Goldstein & Fox P.L.L.C.

(57) ABSTRACT

First and second piezoelectric element overlapped portions of an insulating layer of a flexure part is formed with first and second connecting openings, respectively. There are provided on an upper surface of the insulating layer, first and second lower conductive adhesive agents that electrically connect lower electrode layers of first and second piezoelectric elements to a voltage supply wiring through the first and second connecting openings, and a surrounding insulative adhesive agent that is arranged so as to surround the first and second lower conductive adhesive agents in a plan view.

15 Claims, 22 Drawing Sheets

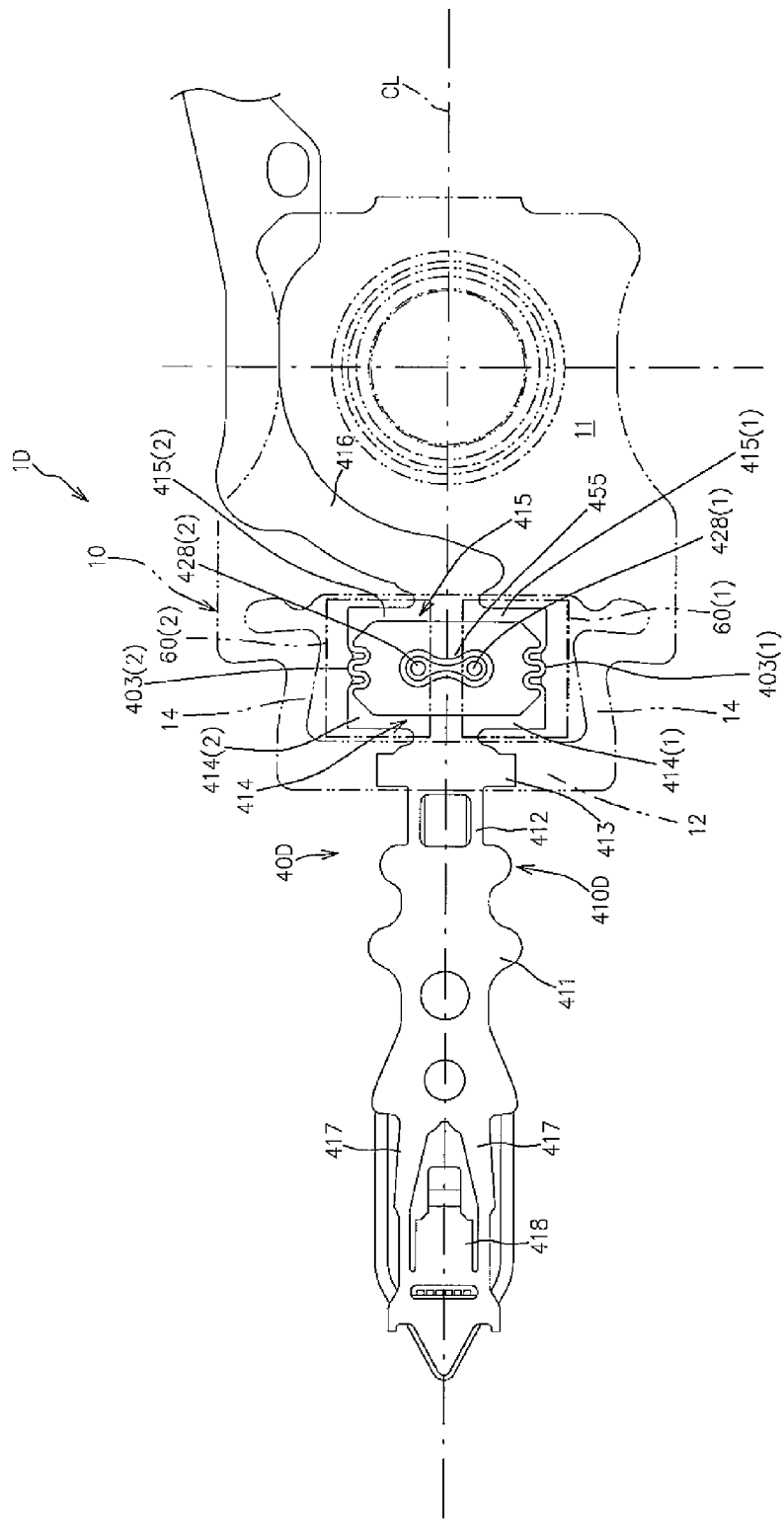

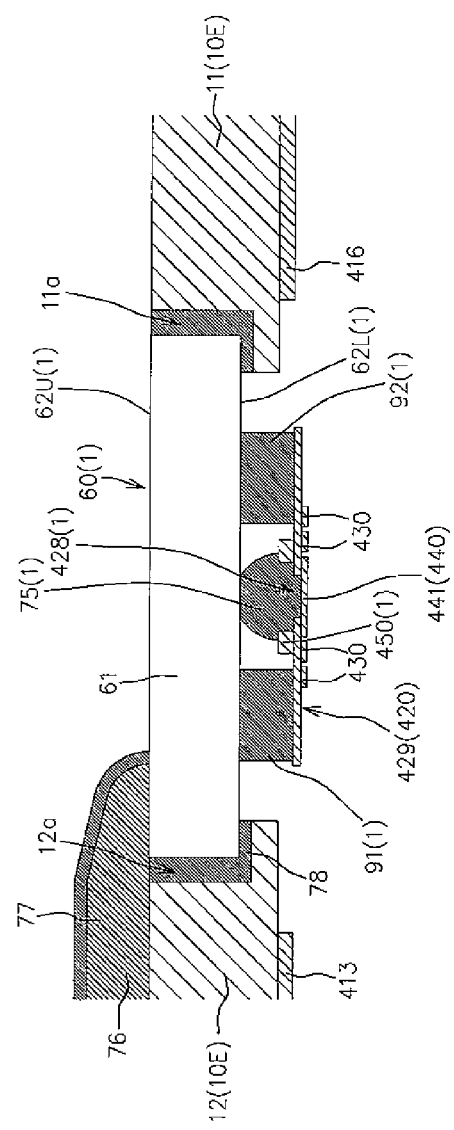

MAGNETIC HEAD SUSPENSION UTILIZING LAMINATE CONDUCTOR CONNECTING PIEZOELECTRIC ELEMENTS VIA FIRST AND SECOND CONNECTING OPENINGS IN THE LAMINATE

BACKGROUND OF THE INVENTION

1. Field of the Invention

The present invention relates to a magnetic head suspension for supporting a magnetic head slider that reads and/or writes data from and to a recording medium such as a hard disk drive.

2. Related Art

Increase in capacity of a magnetic disk device requires improvement in accuracy for positioning a magnetic head slider on a target track. In this regard, there has been proposed a magnetic head suspension that enables coarse motion of a magnetic head slider in a seek direction by a main actuator such as a voice coil motor as well as micro motion of the magnetic head slider in the seek direction by a piezoelectric element functioning as a sub actuator.

For example, Japanese Unexamined Patent Application Publication No. 2009-080915 (hereinafter referred to as prior art document) proposes a magnetic head suspension with the piezoelectric element configured so that supply of a voltage to the piezoelectric element is made with use of a conductor layer of a flexure part.

More specifically, the magnetic head suspension disclosed by the prior art document includes a load bending part that generates a load for pressing the magnetic head slider toward a disk surface, a load beam part that transmits the load to the magnetic head slider, a supporting part that supports the load beam part via the load bending part and is swung about a swing center directly or indirectly by a main actuator, a flexure part that is supported by the load beam part and the supporting part while supporting the magnetic head slider, and paired right and left piezoelectric elements that are attached to the supporting part.

The supporting part is provided with a proximal end section that is connected directly or indirectly to the main actuator, a distal end section to which the load bending part is connected, an open section that is positioned between the proximal end section and the distal end section in a suspension longitudinal direction, and paired right and left connecting beams that are positioned on both sides of the open section in a suspension width direction and connect the proximal end section and the distal end section.

The piezoelectric element includes a piezoelectric a piezoelectric main body, and an upper electrode layer and a lower electrode layer that face to each other with the piezoelectric main body being interposed between them. The piezoelectric element has a distal end and a proximal end fixed to the distal end section and the proximal end section, respectively, by insulative adhesive agents, in a state where the lower electrode layer faces the disk surface.

The flexure part includes a flexure metal plate fixed to disk-facing surfaces of the load beam part and the supporting part by welding or the like, an insulating layer laminated on a disk-facing surface of the flexure metal plate, and the conductor layer laminated on a disk-facing surface of the insulating layer.

The conductor layer includes a signal wiring that is electrically connected to the magnetic head slider, and a voltage supply wiring for supplying a voltage to the piezoelectric elements.

The voltage supply wiring includes a laminated region that is laminated on the disk-facing surface of the insulating layer and an extending region that extends outward from the laminated region so as to face the lower electrode layer of the piezoelectric element. The extending region is electrically connected to the lower electrode layer through a lower conductive adhesive agent.

The upper electrode layer of the piezoelectric element is electrically connected through an upper conductive adhesive agent to an upper surface (a surface positioned on an opposite side from the disk surface) of the distal end section of the supporting part to have a ground potential.

The conventional magnetic head suspension with the above explained configuration is useful in that the supply of the voltage to the piezoelectric elements can be made without any additional elements being substantially required. However, since the lower conductive adhesive agent is exposed outward, there is a problem that filler particles such as Ag particles, which are included in the lower conductive adhesive agent, are likely to fall onto the disk surface. The filler particles, which have been fallen onto the disk surface, may damage the disk surface and the magnetic head slider.

SUMMARY OF THE INVENTION

The present invention has been achieved in view of the above conventional art, and it is an object thereof to provide a magnetic head suspension in which a lower electrode layer of each of piezoelectric elements that is positioned on a side closer to a disk surface is electrically connected through a lower conductive adhesive agent to a voltage supply wiring provided at a flexure part as a part of a conductor layer, the magnetic head suspension capable of effectively preventing filler particles, which are included in the lower conductive adhesive agent, from falling onto the disk surface while having a simple structure.

In order to achieve the object, the present invention provides a magnetic head suspension including a load bending part that generates a load for pressing a magnetic head slider toward a disk surface, a load beam part that transmits the load to the magnetic head slider, a supporting part that supports the load beam part via the load bending part and is swung about a swing center directly or indirectly by a main actuator, a flexure part that is supported by the load beam part and the supporting part while supporting the magnetic head slider, and paired right and left piezoelectric elements that are attached to the supporting part so as to be symmetrical with each other with respect to a suspension longitudinal center line and have expansion and contraction directions different from each other, in order to enable micro motion of the magnetic head slider in a seek direction, wherein the supporting part includes a proximal end section that is directly or indirectly connected to the main actuator, a distal end section to which the load bending part is connected, an open section that is positioned between the proximal end section and the distal end section in a suspension longitudinal direction, and paired right and left connecting beams that are positioned outward of the open section in a suspension width direction and connect the proximal end section and the distal end section, wherein each of the paired first and second piezoelectric elements has a piezoelectric main body, and an upper electrode layer and a lower electrode layer that face each other with the piezoelectric main body being interposed between them, each of the first and second piezoelectric elements having a distal portion and a proximal portion that are directly or indirectly connected to the distal end section and the proximal end section, respectively, in a state where it is at least partially positioned within the open section in a plan view as viewed along a direction orthogonal to the disk surface while the lower electrode layer facing the disk surface, wherein the flexure part includes a flexure metal plate fixed to lower surfaces of the load beam part and the supporting part that face the disk surface, an insulating layer laminated on a lower surface of the flexure metal plate that faces the disk surface, and a conductor layer laminated on a lower surface of the insulating layer that faces the disk surface, wherein the insulating layer includes first and second piezoelectric element overlapped portions that are positioned within the open section and are overlapped with the first and second piezoelectric elements, respectively, in a plan view as viewed along the direction orthogonal to the disk surface, wherein the conductor layer includes a signal wiring having a proximal end capable of being electrically connected to an outside and a distal end capable of being electrically connected to the magnetic head slider, and a voltage supply wiring having a proximal end capable of being electrically connected to an outside, wherein the first and second piezoelectric element overlapped portions are formed with first and second connecting openings, respectively, that extend between the lower surfaces facing the disk surface and the upper surfaces opposite from the disk surface, and wherein there are provided, on the upper surface of the insulating layer, first and second lower conductive adhesive agents that electrically connect the lower electrode layers of the first and second piezoelectric elements to the voltage supply wiring through the first and second connecting openings, and a surrounding insulative adhesive agent that is arranged so as to surround the first and second lower conductive adhesive agents in a plan view.

The magnetic head suspension according to the present invention makes it possible to simplify a structure for supplying voltage to the first and second piezoelectric elements, since the lower electrode layers of the first and second piezoelectric elements are electrically connected to the voltage supply wiring that is integrally provided in the flexure part through the lower conductive adhesive agents arranged on the upper surface of the insulating layer of the flexure part.

The magnetic head suspension makes it also possible to effectively prevent filler particles, which are included in the lower conductive adhesive agents, from falling onto the disk surface, since the surrounding insulative adhesive agent is arranged on the upper surface of the insulating layer so as to surround the lower conductive adhesive agents in a plan view.

In one embodiment, the surrounding insulative adhesive agent includes first and second surrounding insulative adhesive agents that surround the first and second lower conductive adhesive agents in a plan view, respectively.

The first surrounding insulative adhesive agent includes a first surrounding distal-side insulative adhesive agent and a first surrounding proximal-side insulative adhesive agent that are disposed on a distal side and a proximal side from the first connecting opening in the suspension longitudinal direction, respectively, a first surrounding outer-side insulative adhesive agent that is disposed on an outer side from the first connecting opening in the suspension width direction and connects the first surrounding distal-side insulative adhesive agent and the first surrounding proximal-side insulative adhesive agent, and a first surrounding inner-side insulative adhesive agent that is disposed on an inner side from the first connecting opening in the suspension width direction and connects the first surrounding distal-side insulative adhesive agent and the first surrounding proximal-side insulative adhesive agent.

The second surrounding insulative adhesive agent includes a second surrounding distal-side insulative adhesive agent and a second surrounding proximal-side insulative adhesive agent that are disposed on a distal side and a proximal side from the second connecting opening in the suspension longitudinal direction, respectively, a second surrounding outer-side insulative adhesive agent that is disposed on an outer side from the second connecting opening in the suspension width direction and connects the second surrounding distal-side insulative adhesive agent and the second surrounding proximal-side insulative adhesive agent, and a second surrounding inner-side insulative adhesive agent that is disposed on an inner side from the second connecting opening in the suspension width direction and connects the second surrounding distal-side insulative adhesive agent and the second surrounding proximal-side insulative adhesive agent.

Preferably, the first surrounding insulative adhesive agent is disposed so as to be overlapped with the first piezoelectric element in a plan view and seals a gap between the first lower electrode layer and the insulating layer in the direction orthogonal to the disk surface. The second surrounding insulative adhesive agent is disposed so as to be overlapped with the second piezoelectric element in a plan view and seals a gap between the second lower electrode layer and the insulating layer in the direction orthogonal to the disk surface.

Preferably, the magnetic head suspension according to the present invention further includes first and second metal rings arranged on the upper surface of the insulating layer so as to surround the first and second connecting openings, respectively.

In another embodiment, the surrounding insulative adhesive agent includes a surrounding distal-side insulative adhesive agent and a surrounding proximal-side insulative adhesive agent that are disposed on a distal side and a proximal side from the first and second connecting openings in the suspension longitudinal direction, respectively, a surrounding first outer-side insulative adhesive agent that is disposed on one side from the first and second connecting openings in the suspension width direction and connects the surrounding distal-side insulative adhesive agent and the surrounding proximal-side insulative adhesive agent, and a surrounding second outer-side insulative adhesive agent that is disposed on the other side from the first and second connecting openings in the suspension width direction and connects the surrounding distal-side insulative adhesive agent and the surrounding proximal-side insulative adhesive agent.

Preferably, the surrounding distal-side insulative adhesive agent may include a distal-side first width direction portion and a distal-side second width direction portion that are overlapped with the first and second piezoelectric elements in a plan view, respectively, and a distal-side center portion that extends between the distal-side first and second width direction portions. The surrounding proximal-side insulative adhesive agent may include a proximal-side first width direction portion and a proximal-side second width direction portion that are overlapped with the first and second piezoelectric elements in a plan view, respectively, and a proximal-side center portion that extends between the proximal-side first and second width direction portions.

The surrounding first outer-side insulative adhesive agent is arranged so as to overlap with the first piezoelectric element in a plan view, and the surrounding second outer-side insulative adhesive agent is arranged so as to overlap with the second piezoelectric element in a plan view.

The distal-side first width direction portion, the proximal-side first width direction portion and the surrounding first outer-side insulative adhesive agent are configured so as to close a gap between the first lower electrode layer and the insulating layer with respect to the direction orthogonal to the disk surface. The distal-side second width direction portion, the proximal-side second width direction portion and the surrounding second outer-side insulative adhesive agent are configured so as to close a gap between the second lower electrode layer and the insulating layer with respect to the direction orthogonal to the disk surface.

In a more preferable configuration, the magnetic head suspension according to the present invention further includes a sealing insulative adhesive agent with which first and second space are filled, the first space being defined by the first lower electrode layer, the insulating layer, the distal-side first width direction portion, the proximal-side first width direction portion and the surrounding first outer-side insulative adhesive agent, the second space being defined by the second lower electrode layer, the insulating layer, the distal-side second width direction portion, the proximal-side second width direction portion and the surrounding second outer-side insulative adhesive agent.

The magnetic head suspension preferably further includes a metal ring arranged on the upper surface of the insulating layer so as to surround the first and second connecting openings separately or integrally.

The present invention also provides a magnetic head suspension including a load bending part that generates a load for pressing a magnetic head slider toward a disk surface, a load beam part that transmits the load to the magnetic head slider, a supporting part that supports the load beam part via the load bending part and is swung about a swing center directly or indirectly by a main actuator, a flexure part that is supported by the load beam part and the supporting part while supporting the magnetic head slider, and paired right and left piezoelectric elements that are attached to the supporting part so as to be symmetrical with each other with respect to a suspension longitudinal center line and have expansion and contraction directions different from each other, in order to enable micro motion of the magnetic head slider in a seek direction, wherein the supporting part includes a proximal end section that is directly or indirectly connected to the main actuator, a distal end section to which the load bending part is connected, an open section that is positioned between the proximal end section and the distal end section in a suspension longitudinal direction, and paired right and left connecting beams that are positioned outward of the open section in a suspension width direction and connect the proximal end section and the distal end section, wherein each of the paired first and second piezoelectric elements has a piezoelectric main body, and an upper electrode layer and a lower electrode layer that face each other with the piezoelectric main body being interposed between them, each of the first and second piezoelectric elements having a distal portion and a proximal portion that are directly or indirectly connected to the distal end section and the proximal end section, respectively, in a state where it is at least partially positioned within the open section in a plan view as viewed along a direction orthogonal to the disk surface while the lower electrode layer facing the disk surface, wherein the flexure part includes a flexure metal plate fixed to lower surfaces of the load beam part and the supporting part that face the disk surface, an insulating layer laminated on a lower surface of the flexure metal plate that faces the disk surface, and a conductor layer laminated on a lower surface of the insulating layer that faces the disk surface, wherein the insulating layer includes first and second piezoelectric element overlapped portions that are positioned within the open section and are overlapped with the first and second piezoelectric elements, respectively, in a plan view as viewed along the direction orthogonal to the disk surface, wherein the conductor layer includes a signal wiring having a proximal end capable of being electrically connected to an outside and a distal end capable of being electrically connected to the magnetic head slider, and a voltage supply wiring having a proximal end capable of being electrically connected to an outside, wherein the first and second piezoelectric element overlapped portions are formed with first and second connecting openings, respectively, that extend between the lower surfaces facing the disk surface and the upper surfaces opposite from the disk surface, wherein the magnetic head suspension further includes a single metal ring arranged on the upper surface of the insulating layer that is opposite from the disk surface so as to surround the first and second connecting openings in a plan view, wherein the lower electrode layers of the first and second piezoelectric elements are electrically connected to the supply voltage wiring through a lower conductive adhesive agent provided within the metal ring on the upper surface of the insulating layer, and wherein the magnetic head suspension further comprises a surrounding insulative adhesive agent that is arranged directly or indirectly on the upper surface of the insulating layer so as to surround the metal ring in a plan view.

In any one of the above mentioned various configurations, the flexure metal plate may include a load beam part-overlapped region that is fixed to the lower surface of the load bema part while being overlapped therewith, a supporting part-distal side-overlapped region that is fixed to the lower surface of the distal end section while being overlapped therewith, a load bending part-corresponding part that is positioned between paired leaf springs forming the load bending part in the suspension width direction and connects the load beam part-overlapped region and the supporting part-distal side-overlapped region, a supporting part-proximal side-overlapped region that is fixed to the lower surface of the proximal end section while being overlapped therewith, a distal-side support plate forming region that extends from the supporting part-distal side-overlapped region so as to be positioned within the open section, and a proximal-side support plate forming region that extends from the supporting part-proximal side-overlapped region so as to be positioned within the open section in a state of being away from the distal-side support plate forming region in the suspension longitudinal direction.

The distal-side support plate forming region includes a distal-side center portion that extends from the supporting part-distal side-overlapped region toward the proximal side in the suspension longitudinal direction, and distal-side first and second width direction portions that extend from the distal-side center portion toward one side and the other side in the suspension width direction, respectively.

The proximal-side support plate forming region includes a proximal-side center portion that extends from the supporting part-proximal side-overlapped region toward the distal side in the suspension longitudinal direction, and proximal-side first and second width direction portions that extend from the proximal-side center portion toward one side and the other side in the suspension width direction, respectively.

The insulating layer includes a load beam part-corresponding region, a load bending part-corresponding region, a supporting part-distal side-corresponding region and a supporting part-proximal side-corresponding region that are laminated on the lower surfaces of the load beam part-overlapped region, the load bending part-corresponding part, the supporting part-distal side-overlapped region and the supporting part-proximal side-overlapped region of the flexure metal plate, respectively, and further includes a connecting region that is positioned within the open section so as to connect the supporting part-distal side-corresponding region and the supporting part-proximal side-corresponding region.

The connecting region includes a distal-side support plate overlapped portion and a proximal-side support plate overlapped portion that are respectively laminated on the lower surfaces of the distal-side support plate forming region and the proximal-side support plate forming region, and the first and second piezoelectric element overlapped portions that are positioned between the distal-side support plate overlapped portion and the proximal-side support plate overlapped portion in the suspension longitudinal direction.

The first piezoelectric element has a distal side-end surface and a proximal-side end surface that face a proximal side-end surface of the distal end section and a distal side-end surface of the proximal end section, respectively, with end surface side-insulative adhesive agents being interposed between them, and the lower surface of the first piezoelectric element that faces the disk surface includes a distal side that is fixed to the distal-side first width direction portion by a first fixing distal side-insulative adhesive agent and a proximal side that is fixed to the proximal-side first width direction portion by a first fixing proximal side-insulative adhesive agent.

The second piezoelectric element has a distal side-end surface and a proximal-side end surface that face the proximal side-end surface of the distal end section and the distal side-end surface of the proximal end section, respectively, with the end surface side-insulative adhesive agents being interposed between them, and the lower surface of the second piezoelectric element that faces the disk surface includes a distal side that is fixed to the distal-side second width direction portion by a second fixing distal side-insulative adhesive agent and a proximal side that is fixed to the proximal-side second width direction portion by a second fixing proximal side-insulative adhesive agent.

The first and second fixing distal side-insulative adhesive agents function as an insulative adhesive agent of the surrounding insulative adhesive agent that are positioned on a distal side in the suspension longitudinal direction from the first and second connecting openings.

The first and second fixing proximal side-insulative adhesive agents function as an insulative adhesive agent of the surrounding insulative adhesive agent that are positioned on a proximal side in the suspension longitudinal direction from the first and second connecting openings.

Preferably, the distal-side support plate forming region may be arranged so that there is provided a gap between distal edges of the distal-side first and second width direction portions and a proximal edge of the distal end section, and the proximal-side support plate forming region may be arranged so that there is provided a gap between proximal edges of the proximal-side first and second width direction portions and a distal edge of the proximal end section.

Preferably, the flexure metal plate may include a first distal-side extending piece, a second distal-side extending piece, a first proximal-side extending piece and a second proximal-side extending piece, the first distal-side extending piece being disposed outward of the first connecting opening in the suspension width direction and extending from the distal-side support plate forming region toward the proximal side in the suspension longitudinal direction so as to overlap with the first piezoelectric element in a plan view, the second distal-side extending piece being disposed outward of the second connecting opening in the suspension width direction and extending from the distal-side support plate forming region toward the proximal side in the suspension longitudinal direction so as to overlap with the second piezoelectric element in a plan view, the first proximal-side extending piece being disposed at a substantially same position as the first distal-side extending piece with respect to the suspension width direction and extending toward the distal side in the suspension longitudinal direction from the proximal-side support plate forming region so as to overlap with the first piezoelectric element in a plan view, the second proximal-side extending piece being disposed at a substantially same position as the second distal-side extending piece with respect to the suspension width direction and extending toward the distal side in the suspension longitudinal direction from the proximal-side support plate forming region so as to overlap with the second piezoelectric element in a plan view.

The first distal-side extending piece and the first proximal-side extending piece are separate from each other, and the second distal-side extending piece and the second proximal-side extending piece are separate from each other.

An insulative adhesive agent of the surrounding insulative adhesive agent that is positioned outward of the first connecting opening in the suspension width direction and extends in the suspension longitudinal direction is provided on the upper surfaces of the first distal-side extending piece and the first proximal-side extending piece, and an insulative adhesive agent of the surrounding insulative adhesive agent that is positioned outward of the second connecting opening in the suspension width direction and extends in the suspension longitudinal direction is provided on the upper surfaces of the second distal-side extending piece and the second proximal-side extending piece.

Preferably, the flexure metal plate may include a first connecting piece and a second connecting piece, the first connecting piece connecting the distal-side support plate forming region and the proximal-side support plate forming region in a state of being disposed outward of the first connecting opening in the suspension width direction and overlapped with the first piezoelectric element in a plan view, the second connecting piece connecting the distal-side support plate forming region and the proximal-side support plate forming region in a state of being disposed outward of the second connecting opening in the suspension width direction and overlapped with the second piezoelectric element in a plan view.

The first and second connecting pieces are provided with elastic portions capable of being elastically deformed in the suspension longitudinal direction.

Preferably, the supporting part-distal side-overlapped region and the distal-side support plate forming region are formed with an opening that is across the proximal edge of the distal end section, and the supporting part-proximal side-overlapped region and the proximal-side support plate forming region are formed with an opening that is across the distal edge of the proximal end section.

In an alternative configuration to the configuration in which the first and second piezoelectric elements are supported by use of the flexure metal plate, it is possible that the distal end section is formed on the upper surface with a distal-side cutout (or notch) so as to be opened to the side opposite from the disk surface and the proximal side in the suspension longitudinal direction, the proximal end section is formed on the upper surface with a proximal-side cutout (or notch) so as to be opened to the side opposite from the disk surface and the distal side in the suspension longitudinal direction, and the first and second piezoelectric elements are connected at the distal sides and the proximal sides to the distal-side cutout and the proximal-side cutout by fixing distal side-insulative adhesive agents, respectively.

BRIEF DESCRIPTION OF THE DRAWINGS

FIG. 14 is a top view of a flexure part of a magnetic head suspension according to a fourth embodiment of the present invention.

FIG. 16 is a cross sectional view taken along line XVI-XVI in FIG. 15A.

DETAILED DESCRIPTION OF THE PREFERRED EMBODIMENTS

First Embodiment

Hereinafter, one preferred embodiment of a magnetic head suspension according to the present invention will be described, with reference to the attached drawings.

Figure 1A:
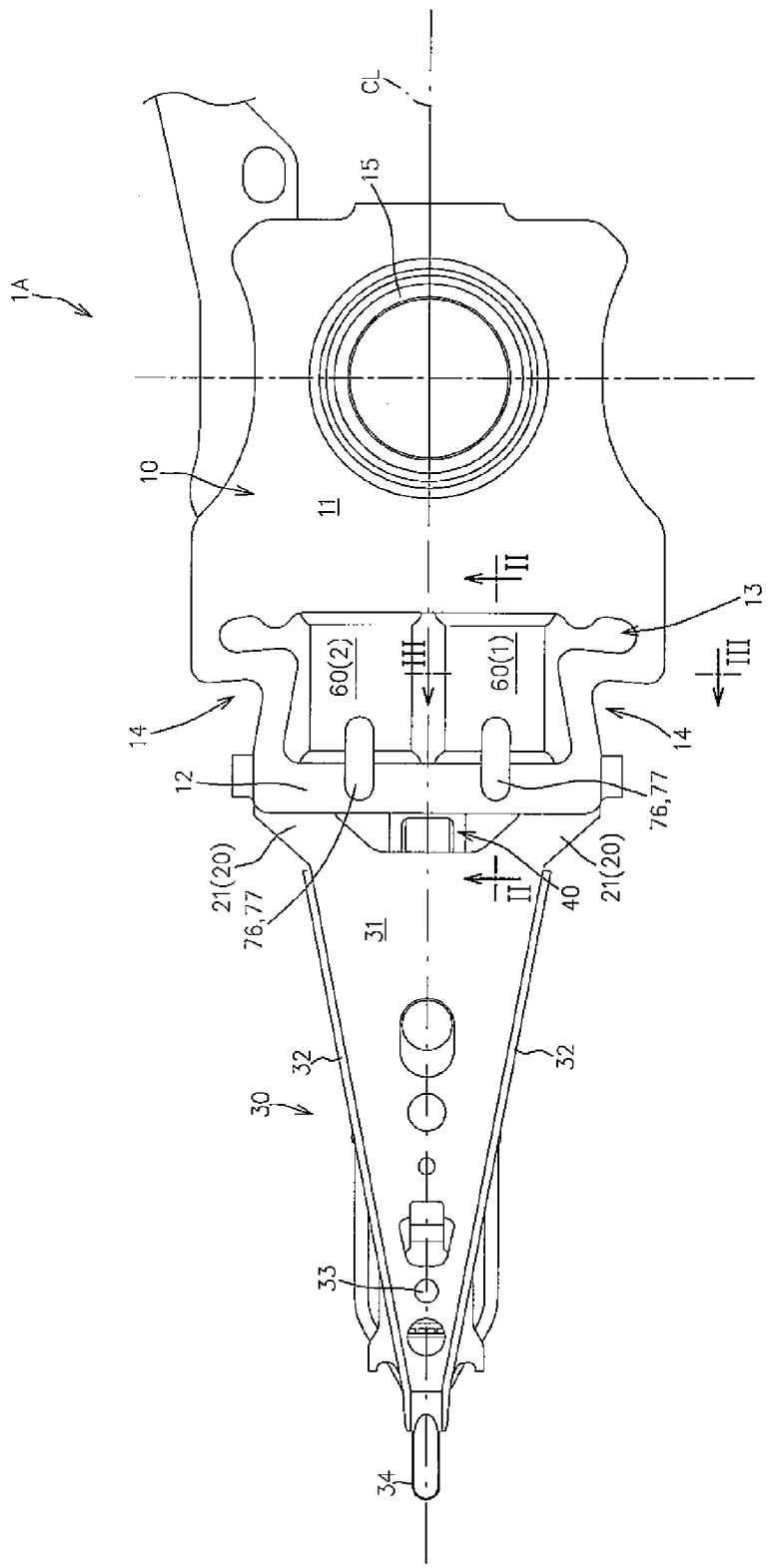
FIG. 1A is a top view of a magnetic head suspension according to a first embodiment of the present invention.
Figure 1B:
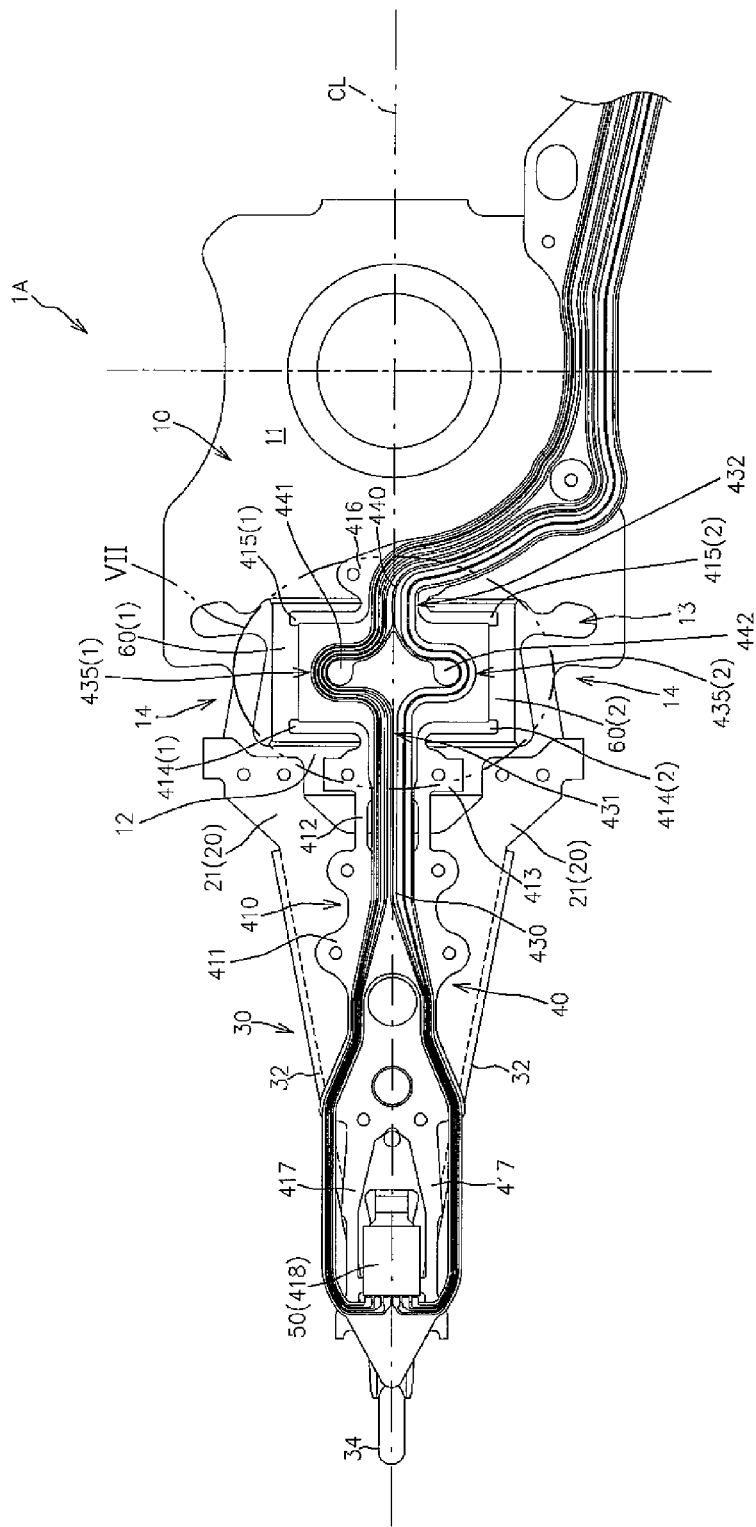
FIG. 1B is a bottom view of the magnetic head suspension according to the first embodiment.

FIGS. 1A and 1B are a top view (a plan view as viewed from a side opposite from a disk surface), and a bottom view (a bottom plan view as viewed from a side close to the disk surface) of a magnetic head suspension 1A according to the present embodiment, respectively. FIG. 1B indicates welding points (more specifically, welding points by laser beam spot welding) with using small circles.

As shown in FIGS. 1A and 1B, the magnetic head suspension 1A includes a load bending part 20 that generates a load for pressing a magnetic head slider 50 toward a disk surface, a load beam part 30 that transmits the load to the magnetic head slider 50, a supporting part 10 that supports the load beam part 30 via the load bending part 20 and is swung about a swing center directly or indirectly by a main actuator, a flexure part 40 that is supported by the load beam part 30 and the supporting part 10 while supporting the magnetic head slider 50, and paired first and second piezoelectric elements 60(1), 60(2) that are attached to the supporting part 10 on right and left sides so as to be symmetrical with each other with a suspension longitudinal center line CL as a reference and have expansion and contraction directions different from each other, in order to enable micro motion of the magnetic head slider 50 in a seek direction.

The supporting part 10 is a member for supporting the load beam part 30 through the load bending part 20 while being directly or indirectly connected to the main actuator such as a voice coil motor, and is therefore made to have relatively high rigidity.

In the present embodiment, the supporting part 10 is formed as a base plate including a boss portion 15 to which a distal end of a carriage arm (not shown) is joined by a swage processing, the carriage arm being connected to the main actuator.

The supporting part 10 may be preferably made from, for example, a stainless plate having a thickness of 0.1 mm to 0.8 mm.

It is of course possible to adopt as the supporting part 10 an arm having a proximal end that is connected to the swing center of the main actuator.

The supporting part 10 includes a proximal end section 11 that is directly or indirectly connected to the main actuator, a distal end section 12 to which the load bending part 20 is connected, an open section 13 that is positioned between the proximal end section 11 and the distal end section 12 in a suspension longitudinal direction, and paired right and left connecting beams 14 that are positioned on both sides of the open section 13 in a suspension width direction and connect the proximal end section 11 and the distal end section 12.

As described above, the load beam part 30 is a member for transmitting the load generated by the load bending part 20 to the magnetic head slider 50, and therefore is required to have a predetermined rigidity.

As shown in FIGS. 1A and 1B, in the present embodiment, the load beam part 30 has a plate-like main body portion 31 and flange portions 32 that are formed by being bent in a direction away from the disk surface at both sides of the main body portion 31 in the suspension width direction, and secures the rigidity thanks to the flange portions 32.

The load beam part 30 may be made from, for example, a stainless plate having a thickness of 0.02 mm to 0.1 mm.

Specifically, the load beam part 30 is provided, at its distal end section, with a protrusion 33 that is so-called dimple.

The protrusion 33 is protruded by, for example, about 0.05 mm to 0.1 mm, in a direction toward the disk surface. The protrusion 33 is brought into contact with an upper surface (a surface opposite from the disk surface) of a head-mounting region 418 of the flexure part 40, so that the load is transmitted to the head-mounting region 418 of the flexure part 40 through the protrusion 33.

In the present embodiment, the load beam part 30 further integrally includes a lift tab 34 that extends from a distal end of the main body portion 31 toward a distal end side in the suspension longitudinal direction. The lift tab 34 is a member that engages with a lamp provided in a magnetic disk device so as to cause the magnetic head suspension 50 to be away from the disk surface in z direction (a direction perpendicular to the disk surface) at the time when the magnetic head suspension 1A is swung by the main actuator so that the magnetic head slider 50 is positioned outward of the disk surface in a radial direction.

The load bending part 20 has a proximal end connected to the supporting part 10 and a distal end connected to the load beam part 30, and generates the load for pressing the magnetic head suspension 50 toward the disk surface in accordance with its elastic deformation.

As shown in FIGS. 1A and 1B, in the present embodiment, the load bending part 20 includes paired right and left leaf springs 21 that have plate surfaces facing the disk surface and are disposed away from each other with the suspension longitudinal center line CL being sandwiched between them.

Preferably, the paired leaf springs 21 are elastically bended in such a direction as to cause the magnetic head suspension 50 to be come close to the disk surface before the magnetic head suspension 1A is mounted to the magnetic disk device, and is mounted to the magnetic disk device in a state where the paired leaf springs are elastically bended back so as to generate the pressing load.

The load bending part 20 is made from a stainless steel plate of 0.02 mm to 0.1 mm thick, for example.

In the present embodiment, as shown in FIGS. 1A and to 1B, the load bending part 20 is integrally formed with the load beam part 30.

More specifically, the magnetic head suspension 1A according to the present embodiment includes a load beam part/load bending part component that is cut out from a metal substrate so as to integrally form the load beam part 30 and the load bending part 20. The load beam part/load bending part component is fixed by welding or the like to the supporting part 10 in a state where an upper surface, which is positioned on a side opposite from the disk surface, of a proximal side of the load beam part/load bending part component is brought into contact with a lower surface, which faces the disk surface, of the distal end section 12 of the supporting part 10.

Figure 2:
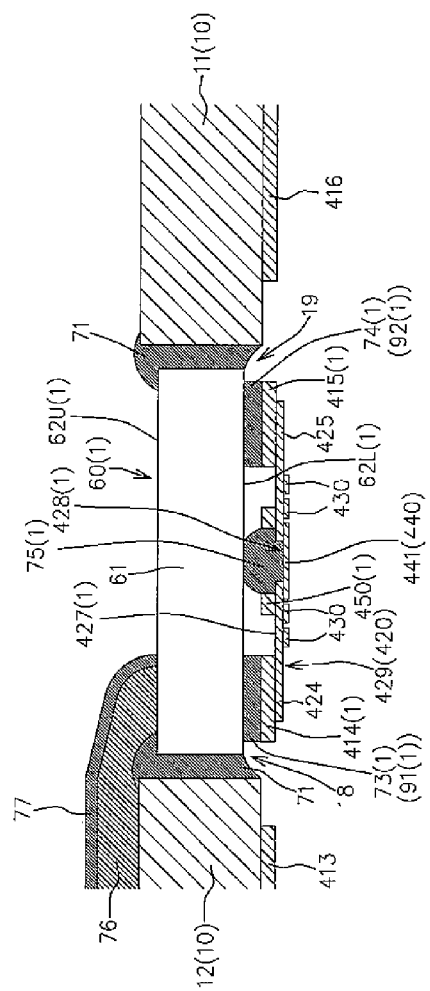
FIG. 2 is a cross sectional view taken along line II-II in FIG. 1A.
Figure 3:
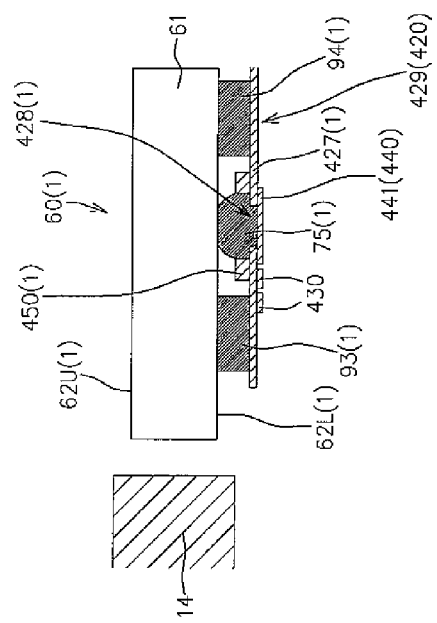
FIG. 3 is a cross sectional view taken along line in FIG. 1A.

FIGS. 2 and 3 are cross sectional views taken along lines II-II and III-III in FIG. 1A, respectively.

Figure 4:
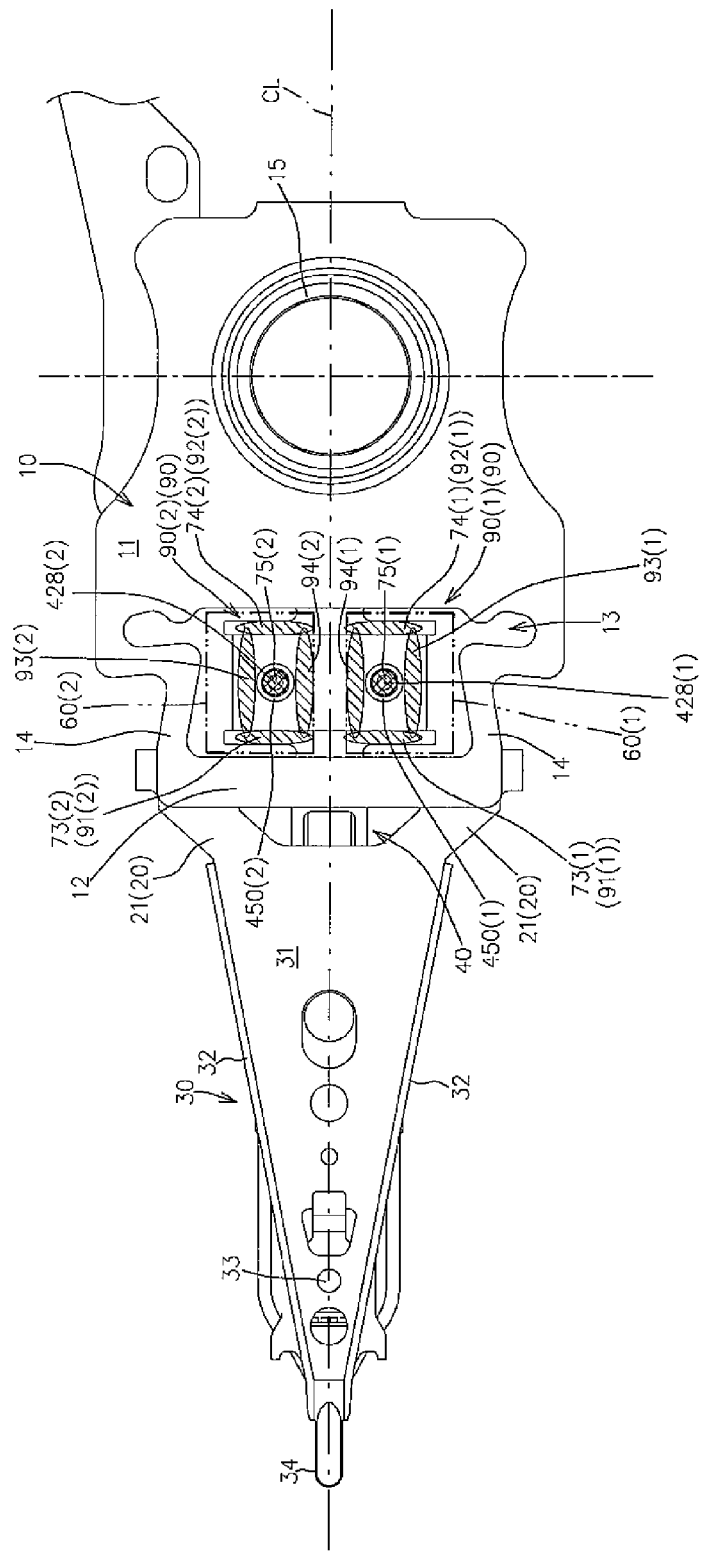
FIG. 4 is a top view of the magnetic head suspension according to the first embodiment in a state where the first and second piezoelectric elements have been removed.

FIG. 4 is a top view of the magnetic head suspension 1A in a state where the first and second piezoelectric elements 60(1), 60(2) have been removed. It is noted that, for the purpose of easier understanding, the first and second piezoelectric elements 60(1), 60(2) are shown with chain double-dashed line in FIG. 4.

As shown in FIGS. 2 and 3, each of the first and second piezoelectric elements 60(1), 60(2) has a piezoelectric main body 61 made of PZT (lead zirconate titanate), and an upper electrode layer 62U and a lower electrode layer 62L that face to each other with the piezoelectric main body 61 being interposed between them.

Each of the first and second piezoelectric elements 60(1), 60(2) has a distal portion and a proximal portion that are directly or indirectly connected to the distal end section 12 and the proximal end section 11, respectively, so that it is at least partially positioned within the open section 13 in a plan view as viewed along a direction orthogonal to the disk surface in a state where the lower electrode layer 62L faces the disk surface.

The piezoelectric main body is 0.05 mm to 0.3 mm thick, for example, and the electrode layers 62U, 62L are each made of Ag or Au so as to have a thickness from 0.05 μm to several μm.

In the present embodiment, each of the first and second piezoelectric elements 60(1), 60(2) is connected to the supporting section 10 with use of a distal-side support plate forming region 414 and a proximal-side support plate forming region 415, which are mentioned below, of the flexure part 40 so that at least a part of its distal side-end surface faces a proximal side-end surface of the distal end section 12 and at least a part of its proximal-side end surface faces a distal side-end surface of the proximal end section 11.

A supporting structure for the first and second piezoelectric elements 60(1), 60(2) is explained later.

The flexure part 40 is fixed by welding or the like to the load beam part 30 and the supporting part 10 while supporting the magnetic head slider 50.

In the present embodiment, the flexure part 40 integrally includes a signal wiring 430 for sending and receiving signal to and from the magnetic head slider 50, and a voltage supply wiring 440 for supplying voltage to the piezoelectric elements 60(1), 60(2).

Figure 5:
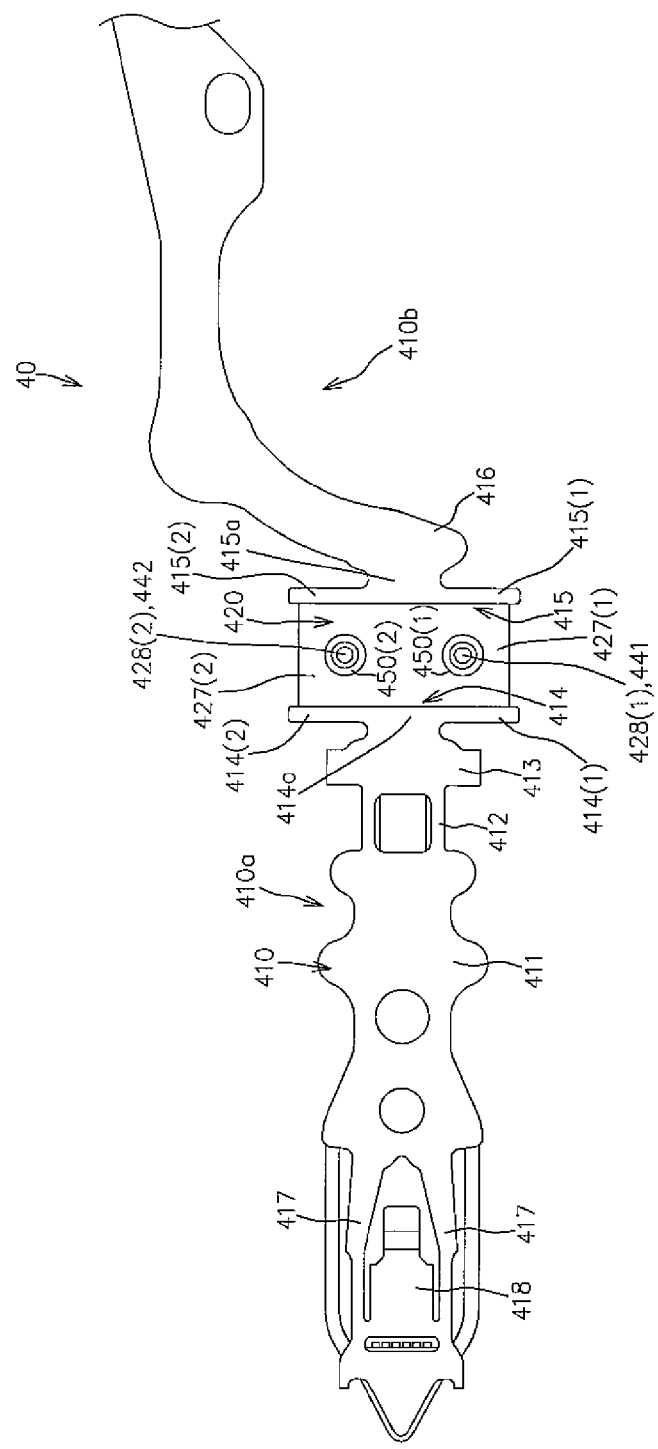
FIG. 5 is a top view of a flexure part of the magnetic head suspension according to the first embodiment.
Figure 6:
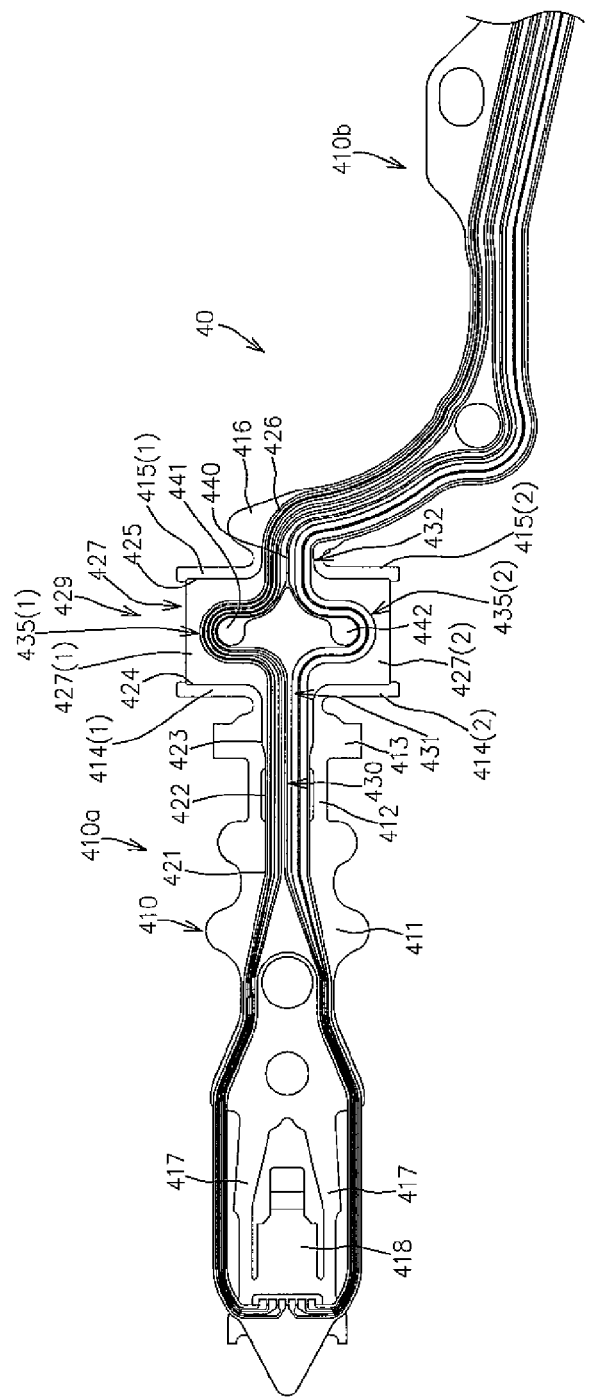
FIG. 6 is a bottom view of the flexure part shown in FIG. 5.

FIGS. 5 and 6 are a top view and a bottom view of the flexure part 40, respectively.

As shown in FIGS. 1B, 5 and 6, the flexure part 40 includes a flexure metal plate 410 fixed by welding or the like to lower surfaces of the load beam part 30 and the supporting part 10 that face the disk surface, an insulating layer 420 laminated on a lower surface of the flexure metal plate 410 that faces the disk surface, and a conductor layer having the signal wiring 430 and the voltage supply wiring 440 that are laminated on a lower surface of the insulating layer 420 that faces the disk surface.

Preferably, the flexure part 40 may include a cover layer (not shown) enclosing the conductor layer.

As shown in FIGS. 1B, 5 and 6, in the present embodiment, the flexure metal plate 410 includes a load beam part-overlapped region 411, a supporting part-distal side-overlapped region 413, a load bending part-corresponding part 412 and a supporting part-proximal side-overlapped region 416. The load beam part-overlapped region 411 is fixed by welding or the like to the lower surface of the load bema part 30 while being overlapped therewith. The supporting part-distal side-overlapped region 413 is fixed by welding or the like to the lower surface of the distal end section 12 while being overlapped therewith between the paired leaf springs 21 in the suspension width direction. The load bending part-corresponding part 412 is positioned between the paired leaf springs 21 in the suspension width direction and connects the load beam part-overlapped region 411 and the supporting part-distal side-overlapped, region 413 in the suspension longitudinal direction. The supporting part-proximal side-overlapped region 416 is fixed by welding to the lower surface of the proximal end section 11 while being overlapped therewith.

The flexure metal plate 410 further includes paired supporting pieces 417 that extends toward the distal side from both sides of the load beam part-overlapped region 411 in the suspension width direction, and the head-mounting region 418 supported by the supporting pieces 417.

The head-mounting region 418 supports the magnetic head slider 50 at its lower surface that faces the disk surface, as shown in FIG. 1B.

As described above, the protrusion 33 is brought into contact with the upper surface of the head-mounting region 418, so that the head-mounting region 418 could sway flexibly in a roll direction and in a pitch direction, with the protrusion 33 functioning as a fulcrum.

The flexure metal plate 410 has rigidity lower than that of a member (the load beam substrate in the present embodiment) forming the load beam part 30, so that the head-mounting region 418 could sway in the roll direction and in the pitch direction.

The flexure metal plate 410 may be made from, for example, a stainless plate having a thickness of 0.01 mm to 0.025 mm.

As shown in FIGS. 5 and 6, the flexure metal plate 410 is divided into a distal side section 410a and a proximal side section 410b that are spaced away from each other in the suspension longitudinal direction, the distal side section 410a including the head-mounting region 418, the paired supporting pieces 417, the load beam part-overlapped region 411, the load bending part-corresponding part 412 and the supporting part-distal side-overlapped region 413, and a proximal side section 410b including the supporting part-proximal side-overlapped region 416. The distal side section 410a and the proximal side section 410b are connected to each other through the insulating layer 420.

The insulating layer 420 includes a load beam part-corresponding region 421, a load bending part-corresponding 422, a supporting part-distal side-corresponding region 423 and a supporting part-proximal side-corresponding region 426 that are laminated on the lower surfaces, which face the disk surface, of the load beam part-overlapped region 411, the load bending part-corresponding part 412, the supporting part-distal side-overlapped region 413 and the supporting part-proximal side-overlapped region 416 of the flexure metal plate 410, respectively. The insulating layer 420 further includes a connecting region 429 positioned within the open section 13 so as to connect the supporting part-distal side-corresponding region 423 and the supporting part-proximal side-corresponding region 426.

In the preset embodiment, as described above, the first and second piezoelectric elements 60(1), 60(2) are supported by the supporting part 10 with use of the distal-side support plate forming region 414 and the proximal-side support plate forming region 415.

More specifically, the flexure metal plate 410 further includes the distal-side support plate forming region 414 which extends from the supporting part-distal side-overlapped region 413 toward the proximal side in the suspension longitudinal direction so as to be positioned within the open section 13 and on which distal sides of the lower surfaces of the first and second piezoelectric elements 60(1), 60(2), and the proximal-side support plate forming region 415 which extends from the supporting part-proximal side-overlapped region 416 toward the distal side in the suspension longitudinal direction so as to be positioned within the open section 13 in a state of being away from the distal-side support plate forming region 414 in the suspension longitudinal direction and on which proximal sides of the lower surfaces of the first and second piezoelectric elements 60(1), 60(2).

The distal-side support plate forming region 414 and the proximal-side support plate forming region 415 form the distal side section 410a and the proximal side section 410b, respectively.

The connecting region 429 includes a distal-side support plate overlapped portion 424 and a proximal-side support plate overlapped portion 425 that are respectively laminated on the lower surfaces, which face the disk surface, of the distal-side support plate forming region 414 and the proximal-side support plate forming region 415, and an extending portion 427 that connects the distal-side support plate overlapped portion 424 and the proximal-side support plate overlapped portion 425.

The extending portion 427 includes first and second piezoelectric element overlapped portions 427(1), 427(2) that are overlapped with the first and second piezoelectric elements 60(1), 60(2), respectively, in a plan view as viewed along the direction orthogonal to the disk surface.

As shown in FIG. 5 or the like, the distal-side support plate forming region 414 includes a distal-side center portion 414a that extends from the supporting part-distal side-overlapped region 413 toward the proximal side in the suspension longitudinal direction, and distal-side first and second width direction portions 414(1), 414(2) that extend from the distal-side center portion 414a toward one side and the other side in the suspension width direction, respectively.

The proximal-side support plate forming region 415 includes a proximal-side center portion 415a that extends from the supporting part-proximal side-overlapped region 416 toward the distal side in the suspension longitudinal direction, and proximal-side first and second width direction portions 415(1), 415(2) that extend from the proximal-side center portion 415a toward one side and the other side in the suspension width direction, respectively.

As shown in FIG. 2 or the like, the first piezoelectric element 60(1) has a distal side-end surface and a proximal-side end surface that face a proximal side-end surface of the distal end section 12 and a distal side-end surface of the proximal end section 11, respectively, with end surface side-insulative adhesive agents 71 being interposed between them. The lower surface of the first piezoelectric element 60(1) that faces the disk surface includes a distal side that is fixed to the distal-side first width direction portion 414(1) by a first fixing distal side-insulative adhesive agent 73(1), and a proximal side that is fixed to the proximal-side first width direction portion 415(1) by a first fixing proximal side-insulative adhesive agent 74(1).

Similarly, the second piezoelectric element 60(2) has a distal side-end surface and a proximal-side end surface that face the proximal side-end surface of the distal end section 12 and the distal side-end surface of the proximal end section 11, respectively, with the end surface side-insulative adhesive agents 71 being interposed between them (see FIG. 7 which is mentioned below). The lower surface of the second piezoelectric element 60(2) that faces the disk surface includes a distal side that is fixed to the distal-side second width direction portion 414(2) by a second fixing distal side-insulative adhesive agent, and a proximal side that is fixed to the proximal-side second width direction portion 415(2) by a second fixing proximal side-insulative adhesive agent.

As shown in FIG. 6 or the like, the signal wiring 430 has a proximal end capable of being electrically connected to an outside and a distal end capable of being electrically connected to the magnetic head slider 50.

The voltage supply wiring 440 has a proximal end capable of being electrically connected to an outside and a distal end capable of being electrically connected to the lower electrode layers 62L of the first and second piezoelectric elements 60(1), 60(2).

More specifically, the distal end includes a first piezoelectric element-connecting end portion 441 that is electrically connected to the lower electrode layer 62L (hereinafter, may be referred to as first lower electrode layer 62L(1) in some cases) of the first electrode element 60(1), and a second piezoelectric element-connecting end portion 442 that is electrically connected to the lower electrode layer 62L (hereinafter, may be referred to as first lower electrode layer 62L(2) in some cases) of the second electrode element 60(2).

In the present embodiment, as shown in FIGS. 1B, 2, 4, 5 or the like, the first piezoelectric element-connecting end portion 441 is electrically connected to the first lower electrode layer 62L(1) through a first lower conductive adhesive agent 75(1) in a state of facing the first lower electrode layer 62L(1) of the first piezoelectric element 60(1) through a first connecting opening 428(1) formed in the first piezoelectric element overlapped portion 427(1).

Similarly, as shown in FIGS. 1B, 4, 5 or the like, the second piezoelectric element-connecting end portion 442 is electrically connected to the second lower electrode layer 62L(2) through a second lower conductive adhesive agent 75(2) in a state of facing the second lower electrode layer 62L(2) of the second piezoelectric element 60(2) through a second connecting opening 428(2) formed in the second piezoelectric element overlapped portion 427(2).

Although, in the present embodiment, the distal end portion of the single voltage supply wiring is divided into two end portions, one of which forms the first piezoelectric element-connecting end portion 441 and the other one of which forms the second piezoelectric element-connecting end portion 442, it is of course that the present invention is not limited to the configuration.

For example, it is possible to include a first voltage supply wiring having a distal end that forms the first piezoelectric element-connecting end portion 441 and a second voltage supply wiring having a distal end that forms the second piezoelectric element-connecting end portion 442, as the voltage supply wiring 400.

As shown in FIGS. 1A and 2, the upper electrode layer 62U (a first upper electrode layer 62U(1)) of the first piezoelectric element 60(1) and the upper electrode layer 62U of the second piezoelectric element 60(2) are electrically connected to the supporting part 10 (the distal end section in the present embodiment) through upper conductive adhesive agents 76 to have a ground potential. The upper conductive adhesive agent is surrounded by an insulative adhesive agent 77.

As shown in FIGS. 2 to 4, the magnetic head suspension 1A according to the present invention includes, in addition to the above-mentioned components, a surrounding insulative adhesive agent 90 provided directly or indirectly on an upper surface of the insulating layer 420 that is positioned on an opposite side from the disk surface so as to surround the first and second lower conductive adhesive agents 75(1), 75(2) in a plan view.

The thus configured magnetic head suspension 1A makes it possible to supply voltage to the first and second piezoelectric elements 60(1), 60(2) through the voltage supply wiring 440 integrally provided at the flexure part 40, and also effectively prevent the filler particles (mainly Ag particles), which are included in the first and second lower conductive adhesive agents 75(1), 75(2) for electrically connecting the voltage supply wiring 440 with the first and second piezoelectric elements 60(1), 60(2), from falling onto the disk surface.

In the present embodiment, the surrounding insulative adhesive agent 90 is configured to individually surround the first and second piezoelectric elements 60(1), 60(2) in a plan view.

More specifically, as shown in FIG. 4, the surrounding insulative adhesive agent 90 includes a first surrounding insulative adhesive agent 90(1) that surrounds the first lower conductive adhesive agent 75(1) in a plan view, and a second surrounding insulative adhesive agent 90(2) that surrounds the second lower conductive adhesive agent 75(2) in a plan view.

As shown in FIG. 4, the first surrounding insulative adhesive agent 90(1) includes a first surrounding distal-side insulative adhesive agent 91(1) and a first surrounding proximal-side insulative adhesive agent 92(1) that are disposed on a distal side and a proximal side from the first connecting opening 428(1), respectively, a first surrounding outer-side insulative adhesive agent 93(1) that is disposed on an outer side from the first connecting opening 428(1) in the suspension width direction and connects the first surrounding distal-side insulative adhesive agent 91(1) and the first surrounding proximal-side insulative adhesive agent 92(1), and a first surrounding inner-side insulative adhesive agent 94(1) that is disposed on an inner side from the first connecting opening 428(1) in the suspension width direction and connects the first surrounding distal-side insulative adhesive agent 91(1) and the first surrounding proximal-side insulative adhesive agent 92(1).

As shown in FIG. 4, the second surrounding insulative adhesive agent 90(2) includes a second surrounding distal-side insulative adhesive agent 91(2) and a second surrounding proximal-side insulative adhesive agent 92(2) that are disposed on a distal side and a proximal side from the second connecting opening 428(2), respectively, a second surrounding outer-side insulative adhesive agent 93(2) that is disposed on an outer side from the second connecting opening 428(2) in the suspension width direction and connects the second surrounding distal-side insulative adhesive agent 91(1) and the first surrounding proximal-side insulative adhesive agent 92(2), and a second surrounding inner-side insulative adhesive agent 94(2) that is disposed on an inner side from the second connecting opening 428(2) in the suspension width direction and connects the second surrounding distal-side insulative adhesive agent 91(2) and the second surrounding proximal-side insulative adhesive agent 92(2).

In a preferable configuration, the first surrounding insulative adhesive agent 90(1) is arranged so as to be overlapped with the first piezoelectric element 60(1) in a plan view as shown in FIG. 4, and is formed so as to close a gap between the first lower electrode layer 62L(1) and the insulating layer 420 with respect to a direction orthogonal to the disk surface as shown in FIGS. 2 and 3.

Similarly, the second surrounding insulative adhesive agent 90(2) is arranged so as to be overlapped with the second piezoelectric element 60(2) in a plan view, and is formed so as to close a gap between the second lower electrode layer 62L(2) and the insulating layer 420 with respect to the direction orthogonal to the disk surface.

According to the thus configured configuration in which the first surrounding insulative adhesive agent 90(1) seals the first lower conductive adhesive agent 75(1) in cooperation with the first lower electrode layer 62L(1) and the insulating layer 420, and the second surrounding insulative adhesive agent 90(2) seals the second lower conductive adhesive agent 75(2) in cooperation with the second lower electrode layer 62L(2) and the insulating layer 420, it is possible to more stably prevent the filler particles, which are included in the first and second lower conductive adhesive agents 75(1), 75(2), from falling onto the disk surface.

As explained above, in the present embodiment, the lower surface of the first piezoelectric element 60(1) includes the distal side that is fixed to the distal-side first width direction portion 414(1) through the first fixing distal side-insulative adhesive agent 73(1), and the proximal side that is fixed to the proximal-side first width direction portion 415(1) through the first fixing proximal side-insulative adhesive agent 74(1).

Similarly, the lower surface of the second piezoelectric element 60(2) includes the distal side that is fixed to the distal-side second width direction portion 414(2) through the second fixing distal side-insulative adhesive agent 73(2), and the proximal side that is fixed to the proximal-side second width direction portion 415(2) through the second fixing proximal side-insulative adhesive agent 74(2).

In the configuration, the first fixing distal side-insulative adhesive agent 73(1) and the first fixing proximal side-insulative adhesive agent 74(1) fix the first piezoelectric element 60(1) to the flexure substrate 410, and also function as the first surrounding distal-side insulative adhesive agent 91(1) and the first surrounding proximal-side insulative adhesive agent 92(1), respectively.

Similarly, the second fixing distal side-insulative adhesive agent 73(2) and the second fixing proximal side-insulative adhesive agent 74(2) fix the second piezoelectric element 60(2) to the flexure substrate 410, and also function as the second surrounding distal-side insulative adhesive agent 91(2) and the second surrounding proximal-side insulative adhesive agent 92(2), respectively.

Accordingly, in the present embodiment, the first surrounding outer-side insulative adhesive agent 93(1) is disposed outward of the first connecting opening 428(1) in the suspension width direction, and connects the first fixing distal side-insulative adhesive agent 73(1) and the first fixing proximal side-insulative adhesive agent 74(1) to each other. The first surrounding inner-side insulative adhesive agent 94(1) is disposed inward of the first connecting Opening 428(1) in the suspension width direction, and connects the first fixing distal side-insulative adhesive agent 73(1) and the first fixing proximal side-insulative adhesive agent 74(1) to each other.

Similarly, the second surrounding outer-side insulative adhesive agent 93(2) is disposed outward of the second connecting opening 428(2) in the suspension width direction, and connects the second fixing distal side-insulative adhesive agent 73(2) and the second fixing proximal side-insulative adhesive agent 74(2) to each other. The second surrounding inner-side insulative adhesive agent 94(2) is disposed inward of the second connecting opening 428(2) in the suspension width direction, and connects the second fixing distal side-insulative adhesive agent 73(2) and the second fixing proximal side-insulative adhesive agent 74(2) to each other.

As explained above, in the present embodiment, the flexure metal plate 410 is configured so that the distal side section 410a and the proximal side section 410b are spaced away from each other in the suspension longitudinal direction with the open section 13 being interposed between them, and the distal side section 410a and the proximal side section 410b are connected to each other by the extending portion 427 of the connecting region 429 of the insulating layer 420.

The configuration makes it possible to prevent, as much as possible, the stiffness of the flexure part 40 from disturbing the movement of the distal end section 12 relative to the proximal end section 11, which is caused by the expansion and contraction motion of the paired piezoelectric elements 60(1), 60(2).

As described earlier, in the present embodiment, the flexure part 40 integrally includes the signal wiring 430 for electrically connecting the magnetic head slider 50 with the outside.

As shown in FIG. 1B, the signal wiring 430 extends in the suspension longitudinal direction in a state of being across the open section 13.

In the configuration, the signal wiring 430 may be resistant against the movement of the distal end section 12 relative to the proximal end section 11 based on the expansion and contraction motion of the paired piezoelectric elements 60(1), 60(2).

The magnetic head suspension 1A according to the present embodiment has a following configuration in order to reduce the resistance as much as possible.

Figure 7:
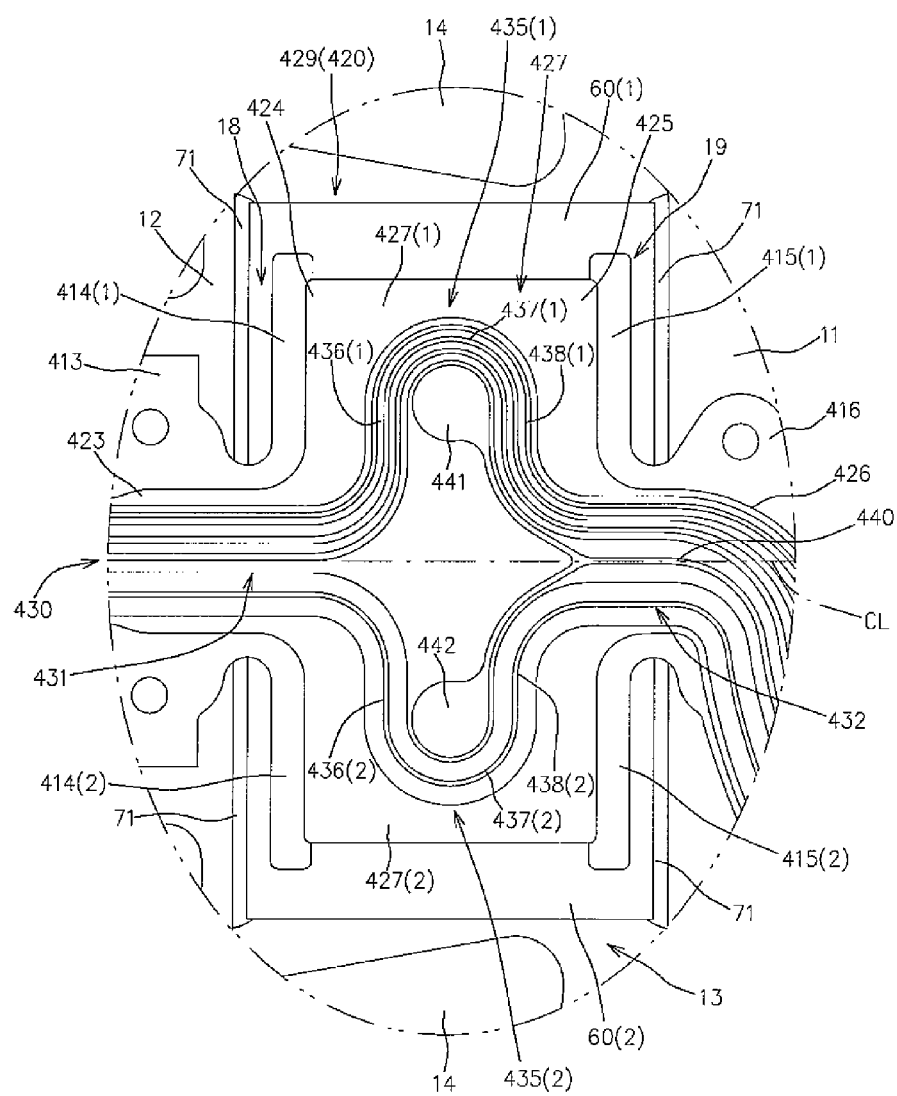
FIG. 7 is an enlarged view of VII portion in FIG. 1B.

FIG. 7 is an enlarged view of VII portion in FIG. 1B.

As shown in FIGS. 1B, 6 and 7, the signal wiring 430 an open section distal portion 431, an open section proximal portion 432 and an open section central portion 435. The open section distal portion 431 extends in the suspension longitudinal direction so as to be across a boundary portion between the distal end section 12 and the open section 13. The open section proximal portion 432 extends in the suspension longitudinal direction so as to be across a boundary portion between the open section 13 and the proximal end section 11.

The open section central portion 435 connects the open section distal portion 431 and the open section proximal portion 432.

The open section distal portion 431 and the open section proximal portion 432 extend in the suspension longitudinal direction at center in the suspension width direction.

The open section central portion 435 includes first and second open section central portions 435(1), 435(2) that are arranged on right and left sides with the suspension longitudinal center line CL as a reference. The first and second open section central portions 435(1), 435(2) are symmetrical to each other with the suspension longitudinal center line CL as a reference to the extent possible.

Figure 9:
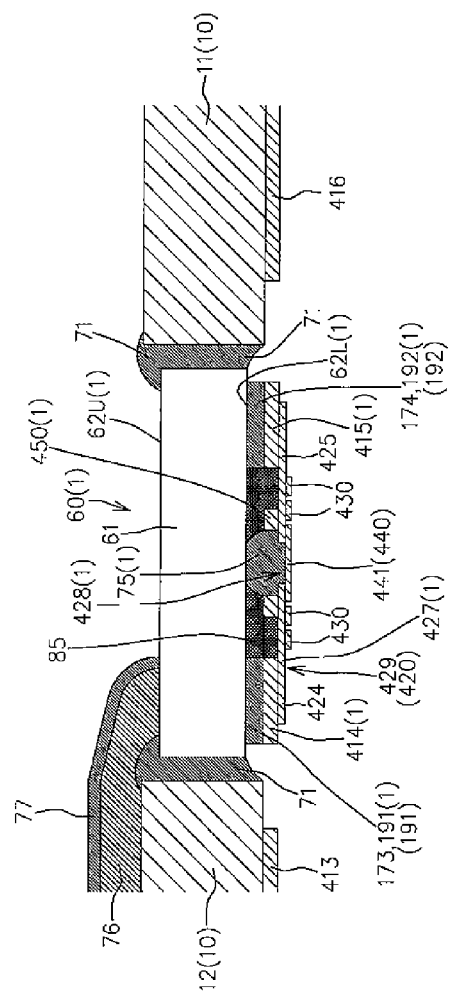
FIG. 9 is a cross sectional view taken along line IX-IX in FIG. 8.

As shown in FIG. 9, the first open section central portion 435(1) has a U-like shape in a plan view including a first distal-side width-direction extending portion 436(1), a first proximal-side width-direction extending portion 438(1) and a first curved portion 437(1). The first distal-side width-direction extending portion 436(1) extends from the proximal end of the open section distal portion 431 toward one side in the suspension width direction. The first proximal-side width-direction extending portion 438(1) extends from the distal end of the open section proximal portion 432 toward the one side in the suspension width direction. The first curved portion 437(1) connects the outer ends in the suspension width direction of the first distal-side width-direction extending portion 436(1) and the first proximal-side width-direction extending portion 438(1), and has a shape that is convex toward the one side in the suspension width direction in a plan view.

The second open section central portion 435(2) has a U-like shape in a plan view including a second distal-side width-direction extending portion 436(2), a second proximal-side width-direction extending portion 438(2) and a second curved portion 437(2). The second distal-side width-direction extending portion 436(2) extends from the proximal end of the open section distal portion 431 toward the other side in the suspension width direction. The second proximal-side width-direction extending portion 438(2) extends from the distal end of the open section proximal portion 432 toward the other side in the suspension width direction. The second curved portion 437(2) connects the outer ends in the suspension width direction of the second distal-side width-direction extending portion 436(2) and the second proximal-side width-direction extending portion 438(2), and has a shape that is convex toward the other side in the suspension width direction in a plan view.

As explained above, the open section central portion 435 of the signal wiring 430 that is positioned between the distal side section 410a and the proximal side section 410b in the suspension longitudinal direction is formed into the U-like shape in a plan view that is convex outward in the suspension width direction. The configuration makes it possible to weaken the stiffness of the signal wiring 430 with respect to the suspension longitudinal direction that is the expansion and contraction direction of the paired piezoelectric elements 60(1), 60(2), thereby prevent as much as possible the signal wiring 430 from becoming an obstacle to the expansion and contraction motion of the paired piezoelectric elements 60(1), 60(2).

As shown in FIGS. 2 and 7, in the present embodiment, the distal end side-first width portion 414(1) and the distal end side-second width portion 414(2) are arranged so that there is a gap between the respective width portions 414(1), 414(2) and the distal end section 12.

The configuration makes it possible to effectively prevent the end surface side-insulative adhesive agents 71 as well as the first and second fixing distal side-insulative adhesive agents 73(1), 73(2) from entering between the supporting part-distal side-overlapped region 413 and the distal end section 12, wherein the end surface side-insulative adhesive agents 71 are interposed between the respective distal side-end surfaces of the first and second piezoelectric elements 60(1), 60(2) and the proximal side-end surface of the distal end section 12, and the first and second fixing distal side-insulative adhesive agents 73(1), 73(2) also function as the first and second surrounding distal-side insulative adhesive agents 91(1), 91(2), respectively.

More specifically, in a case where the distal-side first and second width direction portions 414(1), 414(2) are arranged so as to be across the proximal edge of the distal end section 12, the end surface side-insulative adhesive agents 71 as well as the first and second fixing distal side-insulative adhesive agents 73(1), 73(2) may enter between the supporting part-distal side-overlapped region 413 and the distal end section 12, which are ideally in intimate contact with each other. Both the supporting part-distal side-overlapped region 413 and the distal end section 12, which are ideally in intimate contact with each other, are formed by rigid members such as SUS. Accordingly, if the insulative adhesive agents enter between them, the filler particles may get out of the insulative adhesive agents 71, 73(1), 73(2) the location between them in accordance with the expansion and contraction motion of the paired piezoelectric elements 60(1), 60(2).

On the other hand, in the present embodiment, as described above, the distal-side first and second width direction portions 414(1), 414(2) are arranged so that there is provided the gap 18 between the respective distal edges and the proximal edge of the distal end section 12. Accordingly, the insulative adhesive agents 71, 73(1), 73(2) are prevented from entering into the contacted portion between the supporting part-distal side-overlapped region 413 and the distal end section 12, whereby the above-explained defect can be effectively prevented.

For the same reason, in the present embodiment, as shown in FIGS. 2 and 7, the proximal-side first and second width direction portions 415(1), 415(2) are arranged so that the respective proximal edges of the proximal-side first and second width direction portions 415(1), 415(2) are spaced away from the distal edge of the proximal end section 11 with a gap 19 being interposed.

Preferably, as shown in FIGS. 2 to 5, there are provided first and second metal rings 450(1), 450(2) on the upper surface of the insulating layer 420 so as to surround the first and second connecting openings 428(1), 428(2), respectively.

The provision of the first and second metal rings 450(1), 450(2) makes it possible to suppress the spreading of the first and second lower conductive adhesive agents 75(1), 75(2), thereby reliably securing electric connections between the lower electrode layers 62L of the first and second piezoelectric elements 60(1), 60(2) and the first and second voltage supply wirings 440(1), 440(2) by the first and second lower conductive adhesive agents 75(1), 75(2). Furthermore, it is effectively prevented that the first and second lower conductive adhesive agents 75(1), 75(2) spread to run into the first and second surrounding insulative adhesive agents 90(1), 90(2).

The first and second metal rings 450(1), 450(2) may be formed with utilizing a metal substrate that forms the flexure metal plate 410.

More specifically, the flexure metal plate 410 is formed by laminating the insulting layer 420 on a lower surface of the metal substrate that faces the disk surface and then removing unnecessary portions from the metal substrate by etching. The first and second metal rings 450(1), 450(2) are easily formed by performing the etching in such a manner as that the first and second metal rings 450(1), 450(2) as well as the flexure metal plate 410 remains.

Second Embodiment

Hereinafter, another embodiment of the magnetic head suspension according to the present invention will be described, with reference to the attached drawings.

Figure 8:
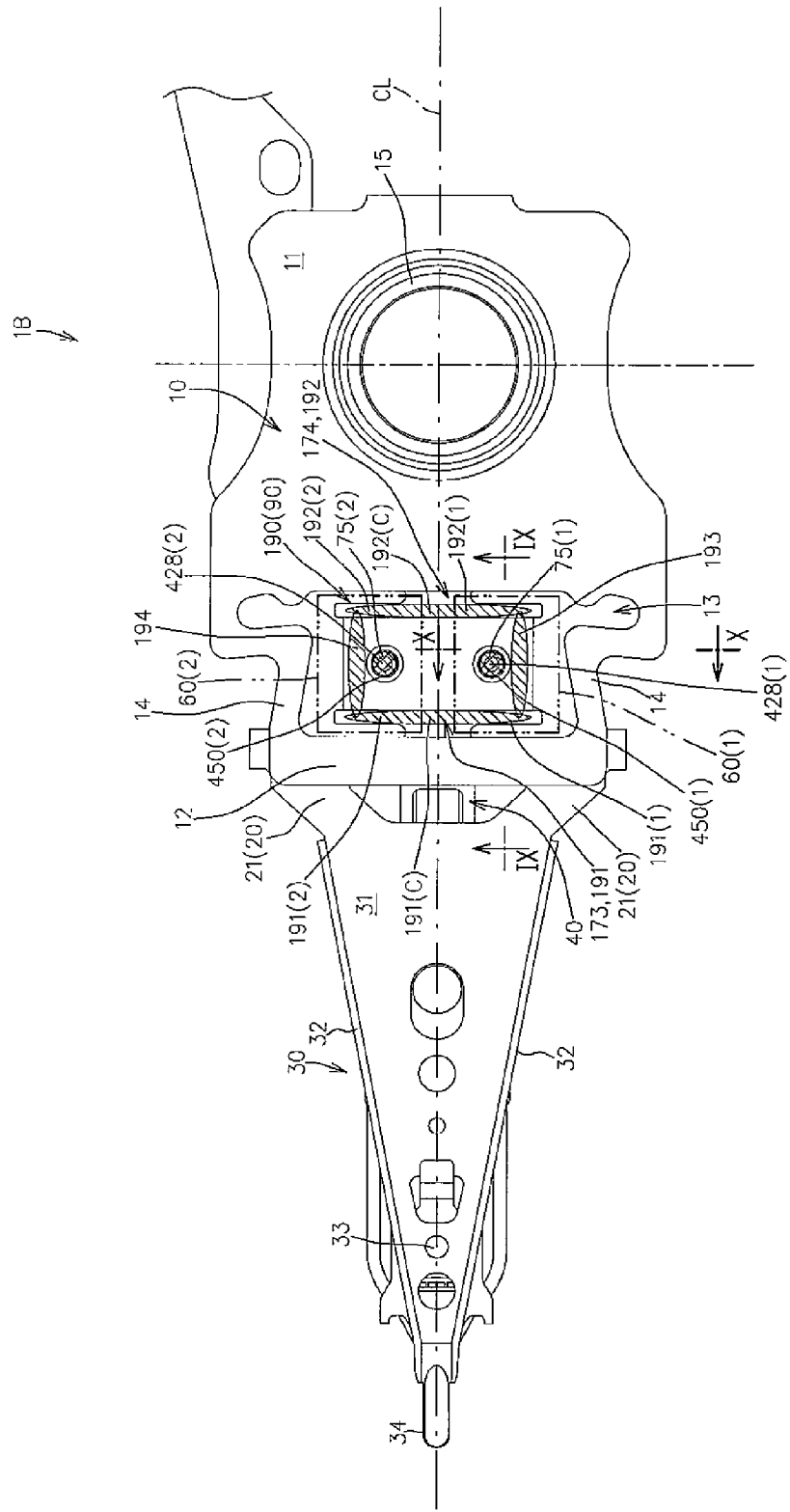
FIG. 8 is a top view of a magnetic head suspension according to a second embodiment of the present invention, and shows a state where the first and second piezoelectric elements have been removed.

FIG. 8 is a top view (a plan view as viewed from a side opposite from the disk surface) of a magnetic head suspension 1B according to the present embodiment in a state where the first and second piezoelectric elements 60(1), 60(2) have been removed. It is noted that, for the purpose of easier understanding, the first and second piezoelectric elements 60(1), 60(2) are shown with chain double-dashed line in FIG. 8.

Figure 10:
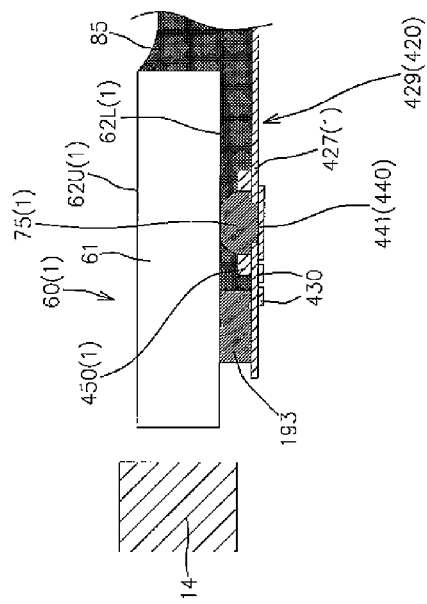
FIG. 10 is a cross sectional view taken along line X-X in FIG. 8.

FIGS. 9 and 10 are cross sectional views taken along lines IX-IX and X-X in FIG. 8, respectively.

In the figures, the members same as those in the first embodiment are denoted by the same reference numerals to omit the detailed description thereof.

As shown in FIG. 8, the magnetic head suspension 1B according to the present embodiment is different from the magnetic head suspension 1A according to the first embodiment in that it includes a single surrounding insulative adhesive agent 190 configured so as to surround both the first and second lower conductive adhesive agents 75(1), 75(2) in a plan view, in place of the first and second lower conductive adhesive agents 75(1), 75(2).

More specifically, the surrounding insulative adhesive agent 190 includes a surrounding distal-side insulative adhesive agent 191 and a surrounding proximal-side insulative adhesive agent 192 that are disposed on a distal side and a proximal side from the first and second connecting openings 428(1), 428(2) in the suspension longitudinal direction, respectively, a surrounding first outer-side insulative adhesive agent 193 that is disposed on one side from the first and second connecting openings 428(1), 428(2) in the suspension width direction and connects the surrounding distal-side insulative adhesive agent 191 and the surrounding proximal-side insulative adhesive agent 192, and a surrounding second outer-side insulative adhesive agent 194 that is disposed on the other side from the first and second connecting openings 428(1), 428(2) in the suspension width direction and connects the surrounding distal-side insulative adhesive agent 191 and the surrounding proximal-side insulative adhesive agent 192.

The thus configured magnetic head suspension 1B can achieve the same effect as the first embodiment.

In a preferable configuration, the surrounding insulative adhesive agent 190 is arranged so as to close a gap between the respective lower electrode layers 62L of the first and second piezoelectric elements 60(1), 60(2) and the insulating layer 420 or the flexure metal plate 410.

More specifically, as shown in FIGS. 8 and 9, the surrounding distal-side insulative adhesive agent 191 includes a distal-side first width direction portion 191(1) and a distal-side second width direction portion 191(2) that are overlapped with the first and second piezoelectric elements 60(1), 60(2) in a plan view, respectively, and a distal-side center portion 191(C) extending between the distal-side first and second width direction portions 191(1), 191(2).

As shown in FIGS. 8 and 9, the surrounding proximal-side insulative adhesive agent 192 includes a proximal-side first width direction portion 192(1) and a proximal-side second width direction portion 192(2) that are overlapped with the first and second piezoelectric elements 60(1), 60(2) in a plan view, respectively, and a proximal-side center portion 192(C) extending between the proximal-side first and second width direction portions 192(1), 192(2).

The surrounding first outer-side insulative adhesive agent 193 is arranged so as to be overlapped with the first piezoelectric element 60(1) in a plan view, and the surrounding second outer-side insulative adhesive agent 194 is arranged so as to be overlapped with the second piezoelectric element 60(2) in a plan view.

In the configuration, the distal-side first width direction portion 191(1), the proximal-side first width direction portion 192(1) and the surrounding first outer-side insulative adhesive agent 193 are arranged so as to close the gap between the first lower electrode layer 62L(1) and the insulating layer 420 with respect to the direction orthogonal to the disk surface. Further, the distal-side second width direction portion 191(2), the proximal-side second width direction portion 192(2) and the surrounding second outer-side insulative adhesive agent 194 are arranged so as to close the gap between the second lower electrode layer 62L(2) and the insulating layer 420 with respect to the direction orthogonal to the disk surface.

The configuration makes it possible to prevent the filler particles, which are included in the first and second lower conductive adhesive agents 75(1), 75(2), from falling onto the disk surface in a more reliable manner.

In the magnetic head suspension 1B according to the present embodiment, in the same manner as in the magnetic head suspensions 1A according to the first embodiment, the first and second piezoelectric elements 60(1), 60(2) has the distal ends that are mounted on the distal-side support plate forming region 414 of the flexure metal plate 410 and the proximal ends that are mounted on the proximal-side support plate forming region 415.

More specifically, each of the first and second piezoelectric elements 60(1), 60(2) has the distal side-end surface and the proximal-side end surface that face the proximal side-end surface of the distal end section 12 and the distal side-end surface of the proximal end section 11, respectively, with the end surface side-insulative adhesive agents 71 being interposed between them. The lower surface of each of the first and second piezoelectric elements 60(1), 60(2) that faces the disk surface includes the distal side that is fixed to the distal-side support plate forming region 414 by a fixing distal side-insulative adhesive agent 173, and the proximal side that is fixed to the proximal-side support plate forming region 415 by a fixing proximal side-insulative adhesive agent 174.

In the configuration, the fixing distal side-insulative adhesive agent 173 and the fixing proximal side-insulative adhesive agent 174 function as the surrounding distal-side insulative adhesive agent 191 and the surrounding proximal-side insulative adhesive agent 192(1), respectively.

Furthermore, as shown in FIGS. 9 and 10, in the present embodiment, a first space defined by the first lower electrode layer 62L(1), the insulating layer 420, the distal-side first width direction portion 191(1), the proximal-side first width direction portion 192(1) and the surrounding first outer-side insulative adhesive agent 193, and a second space defined by the second lower electrode layer 62L(2), the insulating layer 420, the distal-side second width direction portion 191(2), the proximal-side second width direction portion 192(2) and the surrounding second outer-side insulative adhesive agent 194 are filled with a sealing insulative adhesive agent 85.

The configuration makes it possible to prevent the filler particles, which are included in the first and second lower conductive adhesive agents 75(1), 75(2), from falling onto the disk surface in a more reliable manner, and also effectively prevent electrochemical migration of Ag.

More specifically, usage of the magnetic head suspension 1B over long periods of time may give rise to a phenomenon (electrochemical migration) that a metal (mainly Ag) included in the first and second lower surface side-conductive adhesive agents 75(1), 75(2) is ionized (to be mainly Ag+) and moves within an insulative member (a resin included in the first and second conductive adhesive agents 75(1), 75(2) in this case) while growing up. The phenomenon is activated if the ionized substance initiates a chemical reaction with moisture in an atmosphere.

In this regard, in the present embodiment, the first and second lower surface side-conductive adhesive agents 75(1), 75(2) are enclosed with the sealing insulative adhesive agent 85. The configuration makes it possible to prevent electrochemical migration of Ag, and also prevent silver ion from growing up as much as possible.

The magnetic head suspension 1B with the sealing insulative adhesive agent 85 can be efficiently manufactured by a following manufacturing method, for example.

More specifically, the manufacturing method may include a step of connecting the load beam part 20 to the supporting part 10 through the load bending part 20, a step of fixing the flexure part 40 to the load beam part 30 and the supporting part 10 by fixing the flexure metal plate 410 to the load beam part 30 and the supporting part 10 by welding or the like, a first adhesive application step of applying the surrounding distal-side insulative adhesive agent 191 (the fixing distal side-insulative adhesive agent 173 in the present embodiment), the surrounding proximal-side insulative adhesive agent 192 (the fixing proximal side-insulative adhesive agent 174), the surrounding first outer-side insulative adhesive agent 193 and the surrounding second outer-side insulative adhesive agent 194, a second adhesive application step of applying the first and second lower conductive adhesive agents 75(1), 75(2), a piezoelectric element setting step of setting the first and second piezoelectric elements 60(1), 60(2) at respective predetermined positions after the first and second adhesive application steps, a third adhesive application step of applying the end surface side-insulative adhesive agents 71 between the respective distal side-end surfaces of the first and second piezoelectric elements 60(1), 60(2) and the proximal side-end surface of the distal end section 12 and also between the respective proximal-side end surfaces of the first and second piezoelectric elements 60(1), 60(2) and the distal side-end surface of the proximal end section 11 before or after the piezoelectric element setting step, a curing step of curing the adhesives applied by the first to third adhesive application steps so that the first and second piezoelectric elements 60(1), 60(2) are fixed, and a step of filling the sealing insulative adhesive agent 85 into the first and second spaces from the opposite side from the disk surface through the gap between the first and second piezoelectric elements 60(1), 60(2) in the suspension width direction.

The manufacturing method may include a fourth adhesive application step of applying the upper surface side-conductive adhesive agents 76 so as to be across the respective upper electrode layers 62U of the first and second piezoelectric elements 60(1), 60(2), which are positioned on a side opposite from the disk surface, and the distal end section 12 of the supporting part 10.

As in the magnetic head suspension 1A according to the first embodiment, the magnetic head suspension according to the present embodiment includes the first and second metal rings 450(1), 450(2) provided on the upper surface of the insulating layer 420 so as to surround the first and second connecting openings 428(1), 428(2), respectively.

It is possible to include a single metal ring 455 in place of the first and second metal rings 450(1), 450(2).

Figure 11:
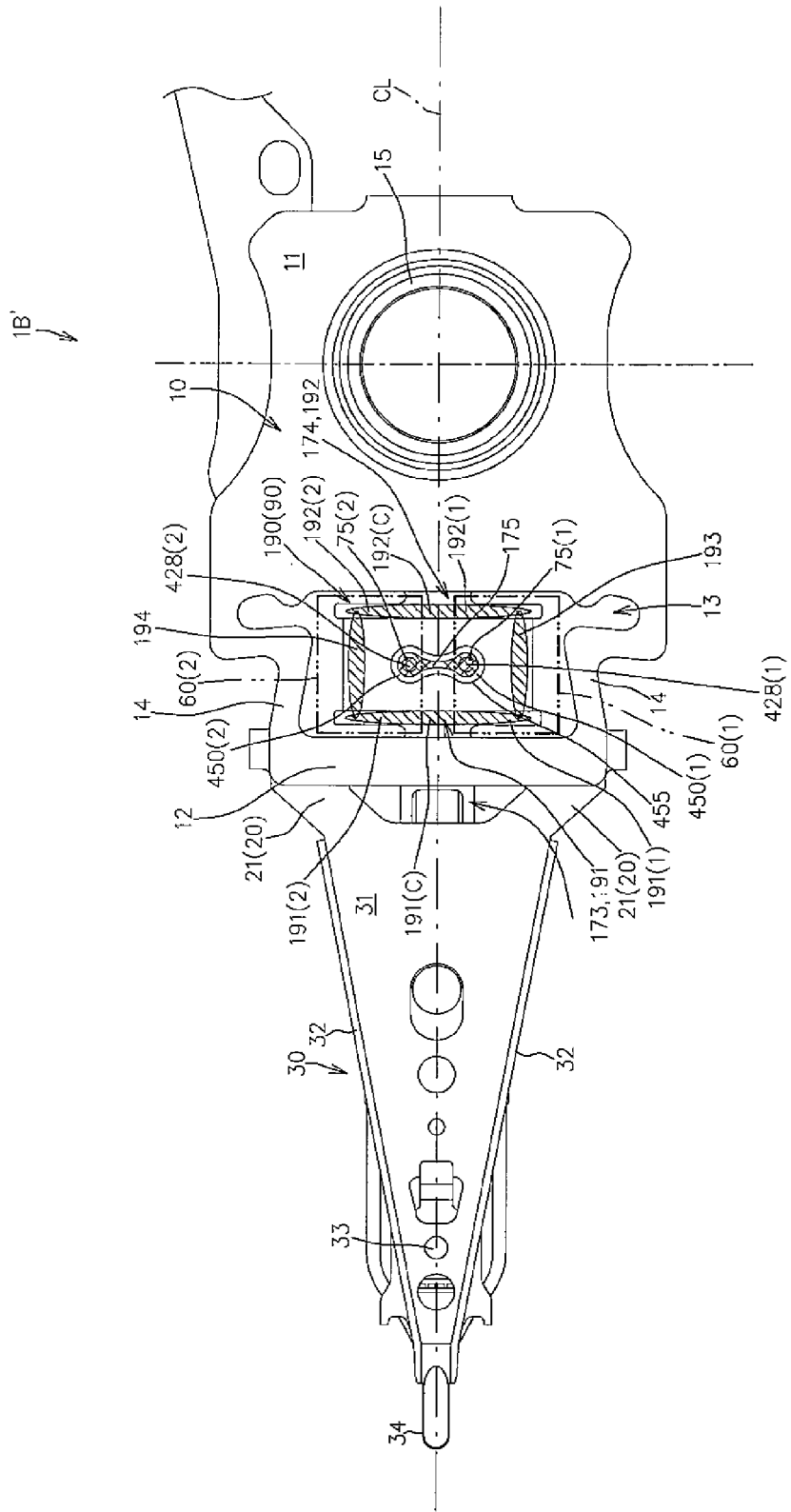
FIG. 11 is a top view of a magnetic head suspension according to a modified example of the second embodiment.

FIG. 11 is a top view of a magnetic head suspension 1B' with the single metal ring 455 according to a modified example.

As shown in FIG. 11, the single metal ring 455 is arranged on the upper surface of the insulating layer 420 so as to surround both the first and second connecting openings 428(1), 428(2).

In this case, the first lower electrode layer 62L(1) of the first piezoelectric element 60(1) and the second lower electrode layer 62L(2) of the second piezoelectric element 60(2) may be electrically connected to the voltage supply wiring 440 through a common lower conductive adhesive agent 175 provided within the metal ring 455 on the upper surface of the insulating layer 420.

In the modified example 1B', it is enough for the voltage supply wiring 440 to have only a single connecting end portion rather than the two connecting end portions of the first piezoelectric element-connecting end portion 441 and the second piezoelectric element-connecting end portion 442, wherein the single connecting end portion is electrically connected to both the first and second lower electrode layers 62L(1), 62L(2) through the common lower conductive adhesive agent 175.

The modified example 1B' makes it also possible to suppress the spreading of the common lower conductive adhesive agent 175, thereby reliably securing electric connections between the lower electrode layers 62L(1), 62L(2) of the first and second piezoelectric elements 60(1), 60(2) and the voltage supply wiring 440 by the common lower conductive adhesive agent 175. Furthermore, it is effectively prevented that the common lower conductive adhesive agent 175 spread to run into the surrounding insulative adhesive agent 190.

Furthermore, in the modified example 1B', the common lower conductive adhesive agent 175 is opened outward through the gap between the first and second piezoelectric elements 60(1), 60(2) in the suspension width direction. The configuration allows the common lower conductive adhesive agent 175 to be irradiated with UV (ultraviolet rays) and hot air through the gap, whereby a temporary curing of the common lower conductive adhesive agent 175 can be efficiently achieved. The temporary curing of the common lower conductive adhesive agent 175 can effectively prevent a disadvantage such as an unintentional deformation of the common lower conductive adhesive agent 175 during subsequent steps.

Third Embodiment

Hereinafter, still another embodiment of the magnetic head suspension according to the present invention will be described, with reference to the attached drawings.

Figure 12:
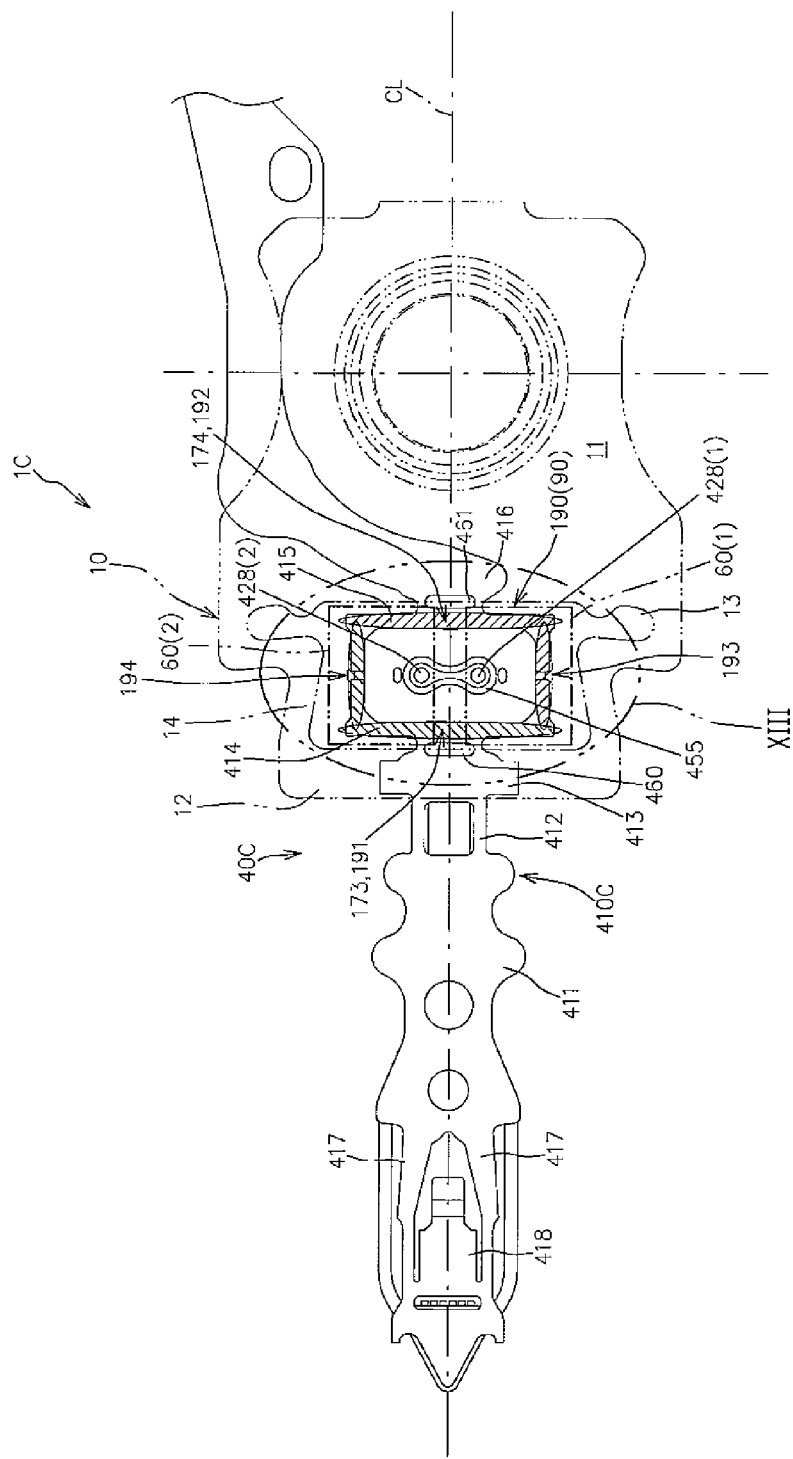
FIG. 12 is a top view of a flexure part of a magnetic head suspension according to a third embodiment of the present invention.

FIG. 12 is a top view (a plan view as viewed from a side opposite from the surface) of a flexure part 40C of a magnetic head suspension 1C according to the present embodiment.

Figure 13:
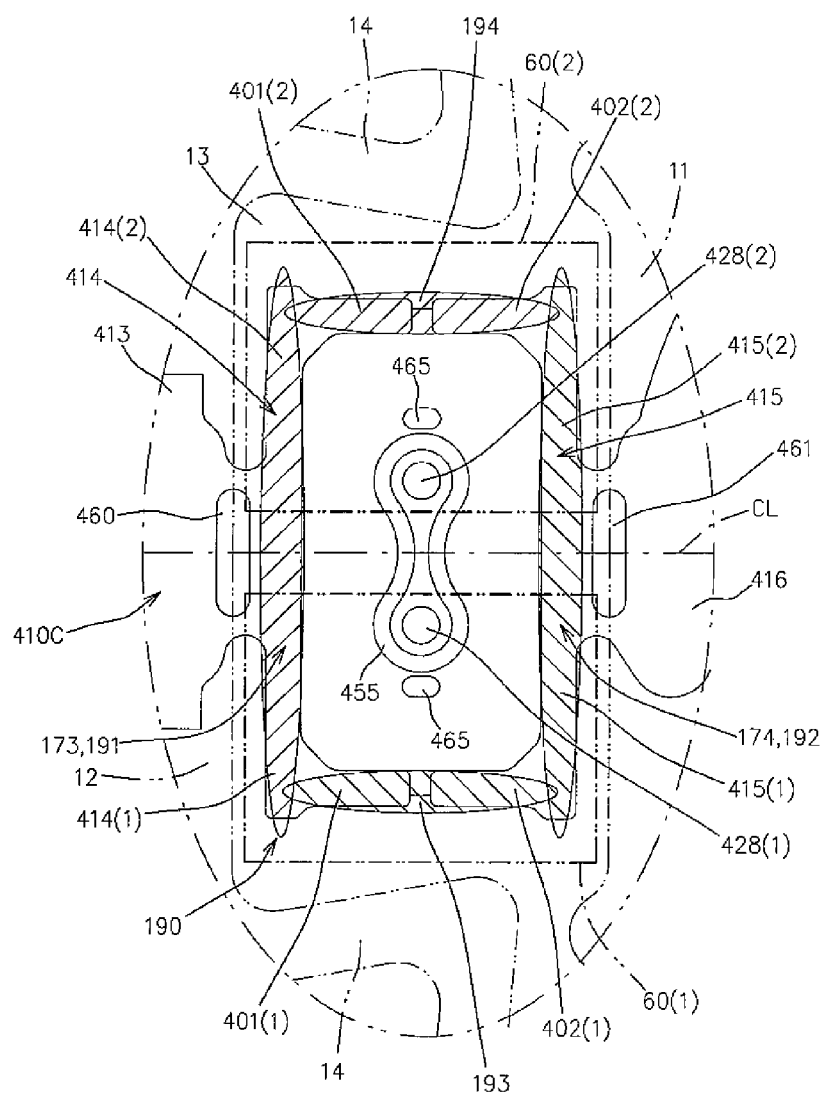
FIG. 13 is an enlarged view of XIII portion in FIG. 12.

Further, FIG. 13 is an enlarged view of XIII portion in FIG. 12.

It is noted that, for the purpose of easier understanding, the first and second piezoelectric elements 60(1), 60(2) as well as the supporting part 10 are shown with chain double-dashed line in FIGS. 12 and 13.

In the figures, the members same as those in the first and second embodiments are denoted by the same reference numerals to omit the detailed description thereof.

The magnetic head suspension 1C according to the present embodiment is different from the magnetic head suspension 1B according to the second embodiment mainly in that the flexure part 40 is replaced with a flexure part 40C.

The flexure part 40C is different from the flexure part 40 in that the flexure metal plate 410 is changed to a flexure metal plate 410C.

More specifically, as shown in FIG. 13, the flexure metal plate 410C has the same components as the flexure metal plate 410, and further includes a first distal-side extending piece 401(1), a second distal-side extending piece 401(1), a first proximal-side extending piece 402(1) and a second proximal-side extending piece 402(2).

The first distal-side extending piece 401(1) is disposed outward of the first connecting opening 428(1) in the suspension width direction, and extends from the distal-side support plate forming region 414 toward the proximal side in the suspension longitudinal direction so as to overlap with the first piezoelectric element 60(1) in a plan view.

In the present embodiment, as shown FIG. 13, the first distal-side extending piece 401(1) extends toward the proximal side in the suspension longitudinal direction from the outer end of the distal-side first width direction portion 414(1) in the suspension width direction.

The second distal-side extending piece 401(2) is disposed outward of the second connecting opening 428(2) in the suspension width direction, and extends from the distal-side support plate forming region 414 toward the proximal side in the suspension longitudinal direction so as to overlap with the second piezoelectric element 60(1) in a plan view.

In the present embodiment, as shown FIG. 13, the second distal-side extending piece 401(2) extends toward the proximal side in the suspension longitudinal direction from the outer end of the distal-side second width direction portion 414(2) in the suspension width direction.

The first proximal-side extending piece 402(1) is disposed at a substantially same position as the first distal-side extending piece 401(1) with respect to the suspension width direction, and extends toward the distal side in the suspension longitudinal direction from the proximal-side support plate forming region 415 so as to overlap with the first piezoelectric element 60(1) in a plan view.

In the present embodiment, as shown in FIG. 13, the first proximal-side extending piece 402(1) extends toward the distal side in the suspension longitudinal direction from the outer end of the proximal end side-first width portion 415(1) in the suspension width direction.

The second proximal-side extending piece 402(2) is disposed at a substantially same position as the second distal-side extending piece 401(2) with respect to the suspension width direction, and extends toward the distal side in the suspension longitudinal direction from the proximal-side support plate forming region 415 so as to overlap with the second piezoelectric element 60(2) in a plan view.

In the present embodiment, as shown in FIG. 13, the second proximal-side extending piece 402(2) extends toward the distal side in the suspension longitudinal direction from the outer end of the proximal end side-second width portion 415(2) in the suspension width direction.

The free ends of the first distal-side extending piece 401(1) and the first proximal-side extending piece 402(1) face each other with being separate from each other. The free ends of the second distal-side extending piece 401(2) and the second proximal-side extending piece 402(2) face each other with being separate from each other.

In the magnetic head suspension 1C with the thus configured flexure metal plate 410C, an insulative adhesive agent (the surrounding first outer-side insulative adhesive agent 193 in the present embodiment) of the surrounding insulative adhesive agent 190 that is disposed outward of the first connecting opening 428(1) in the suspension width direction and extends in the suspension longitudinal direction is provided on upper surfaces of the first distal-side extending piece 401(1) and the first proximal-side extending piece 402(1) that are opposite from the disk surface.

Similarly, an insulative adhesive agent (the surrounding second outer-side insulative adhesive agent 194 in the present embodiment) of the surrounding insulative adhesive agent 190 that is disposed outward of the second connecting opening 428(2) in the suspension width direction and extends in the suspension longitudinal direction is provided on upper surfaces of the second distal-side extending piece 401(2) and the second proximal-side extending piece 402(2) that are opposite from the disk surface.

According to the magnetic head suspension 1C with the configuration, the insulative adhesive agent of the surrounding insulative adhesive agent 190 that is disposed outward of the first connecting opening 428(1) in the suspension width direction and extends in the suspension longitudinal direction is enough to seal a gap between the first distal-side extending piece 401(1) and the first lower electrode layer 62L(1) as well as a gap between the first proximal-side extending piece 402(1) and the first lower electrode layer 62L(1). The insulative adhesive agent of the surrounding insulative adhesive agent 190 that is disposed outward of the second connecting opening 428(2) in the suspension width direction and extends in the suspension longitudinal direction is enough to seal a gap between the second distal-side extending piece 401(2) and the second lower electrode layer 62L(2) as well as a gap between the second proximal-side extending piece 402(2) and the second lower electrode layer 62L(1).

Since the first distal-side extending piece 401(1) and the first proximal-side extending piece 402(1) are separate from each other, and the second distal-side extending piece 401(2) and the second proximal-side extending piece 402(2) are separate from each other, these extending pieces are prevented from disturbing the expansion and contraction motion of the paired piezoelectric elements 60(1), 60(2).

Furthermore, in the present embodiment, as shown in FIGS. 12 and 13, the supporting part-distal side-overlapped region 413 and the distal-side support plate forming region 414 are formed with an opening 460 that is across the proximal edge of the distal end section 12.

The provision of the opening 460 can effectively prevent the end surface side-insulative adhesive agents 71, which is interposed between the respective distal side-end surfaces of the first and second piezoelectric elements 60(1), 60(2) and the proximal-side end surface of the distal end section 12, as well as the surrounding distal-side insulative adhesive agent 191 from entering between the supporting part-distal side-overlapped region 413 and the distal end section 12, thereby effectively preventing a disadvantage that the filler particles are removed from the insulative adhesive agents 71, 190.

For the same purpose, in the present embodiment, the supporting part-proximal side-overlapped region 416 and the proximal-side support plate forming region 415 are formed with an opening 461 that is across the distal edge of the proximal end section 11.

Furthermore, in the present embodiment, as shown in FIG. 13, the insulating layer 420 is formed with an opening 465 that is disposed outward of the metal ring 465 and in the vicinity of the lower conductive adhesive agent 175.

The opening 465 allows the lower conductive adhesive agent 175 to be irradiated with UV (ultraviolet rays) and hot air from the lower surface close to the disk surface.

Fourth Embodiment

Hereinafter, still another embodiment of the magnetic head suspension according to the present invention will be described, with reference to the attached drawings.

FIG. 14 is a top view (a plan view as viewed from a side opposite from the surface) of a flexure part 40D of a magnetic head suspension 1D according to the present embodiment.

In the figures, the members same as those in the first to third embodiments are denoted by the same reference numerals to omit the detailed description thereof.

It is noted that, for the purpose of easier understanding, the first and second piezoelectric elements 60(1), 60(2) as well as the supporting part 10 are shown with chain double-dashed line in FIG. 14.

The magnetic head suspension 1D according to the present embodiment is different from the magnetic head suspension 1C according to the third embodiment mainly in that the flexure metal plate 410D is replaced with a flexure metal plate 410D.

More specifically, as shown in FIG. 14, the flexure metal plate 410D includes a first connecting piece 403(1) and a second connecting piece 403(2). The first connecting piece 403(1) connects the distal-side support plate forming region 414 and the proximal-side support plate forming region 415 in a state of being disposed outward of the first connecting opening 428(1) in the suspension width direction and overlapped with the first piezoelectric element 60(1) in a plan view. The second connecting piece 403(2) connects the distal-side support plate forming region 414 and the proximal-side support plate forming region 415 in a state of being disposed outward of the second connecting opening 428(2) in the suspension width direction and overlapped with the second piezoelectric element 60(2) in a plan view.

Each of the first and second connecting pieces 403(1), 403(2) is provided with an elastic portion capable of being elastically deformed in the suspension longitudinal direction.

In the present embodiment, the elastic portion is formed by an accordion-like structure including first convex portions that project outward in the suspension width direction and second convex portions that project inward in the suspension width direction, the first and second convex portions being arranged alternately to each other in the suspension longitudinal direction. Alternatively, the elastic portion may be formed by a single convex portion that project outward or inward in the suspension width direction.

The magnetic head suspension 1D with the thus configured flexure metal plate 410D makes it possible to stabilize the posture of the flexure part 40D as well as stably support the first and second piezoelectric elements 60(1), 60(2) without disturbing the expansion and contraction motion of the paired piezoelectric elements 60(1), 60(2).

Preferably, in the same manner as the third embodiment, on an upper surface of a portion of the flexure metal plate 410D that extends in the suspension longitudinal direction between the distal-side support plate forming region 414 and the proximal-side support plate forming region 415, the surrounding insulative adhesive agent 190 is provided. More specifically, the insulative adhesive agent 193 (not shown in FIG. 14) of the surrounding insulative adhesive agent 190 that is disposed outward of the first connecting opening 428(1) in the suspension width direction and extends in the suspension longitudinal direction is provided on the upper surface of the first connecting piece 403(1) that is opposite from the disk surface, and the insulative adhesive agent 194 (not shown in FIG. 14) of the surrounding insulative adhesive agent 190 that is disposed outward of the second connecting opening 428(2) in the suspension width direction and extends in the suspension longitudinal direction is provided on the upper surface of the second connecting piece 403(2) that is opposite from the disk surface.

Fifth Embodiment

Hereinafter, still another embodiment of the magnetic head suspension according to the present invention will be described, with reference to the attached drawings.

Figure 15A:
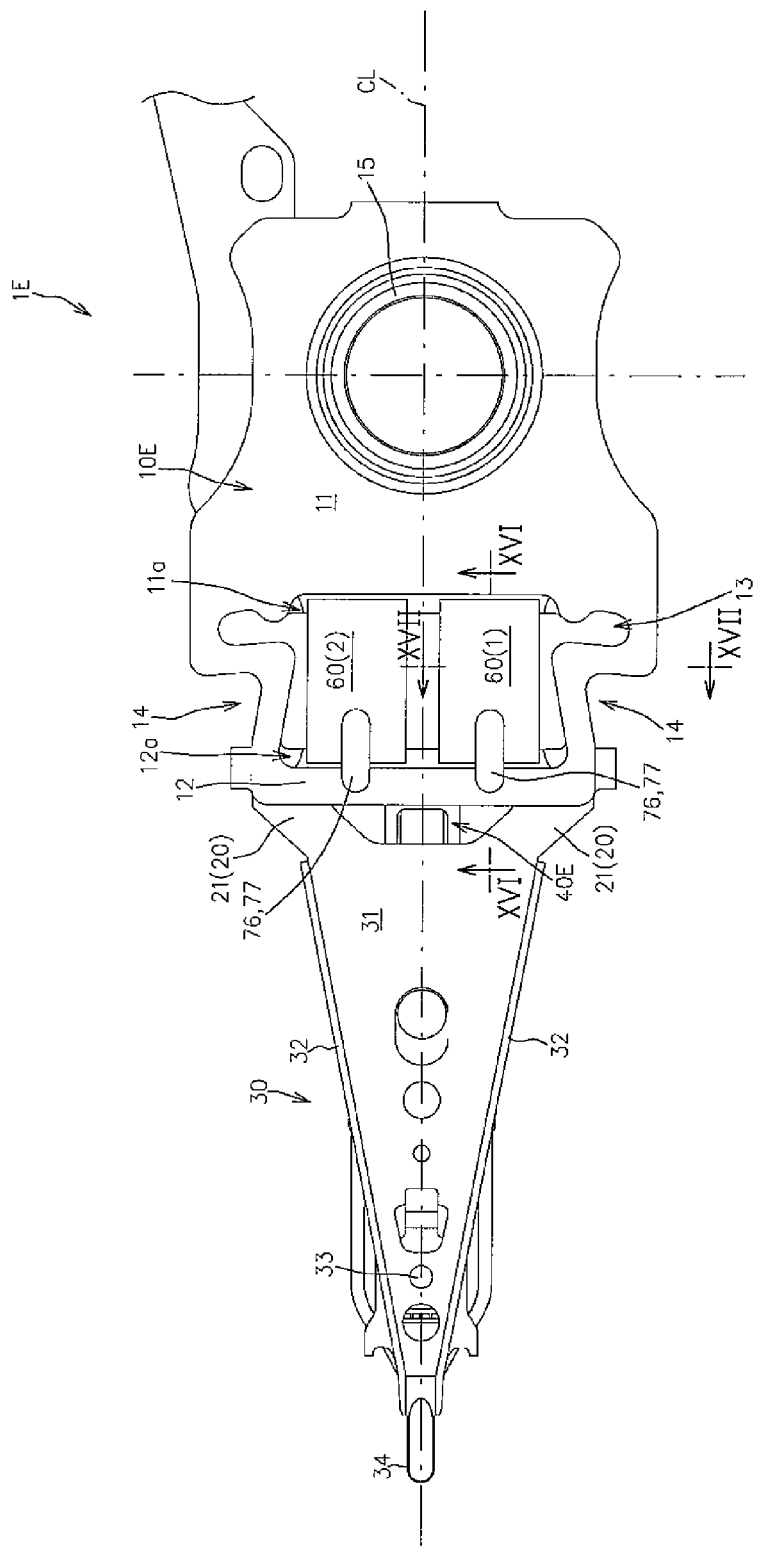
FIG. 15A is a top view of a magnetic head suspension according to a fifth embodiment of the present invention.
Figure 15B:
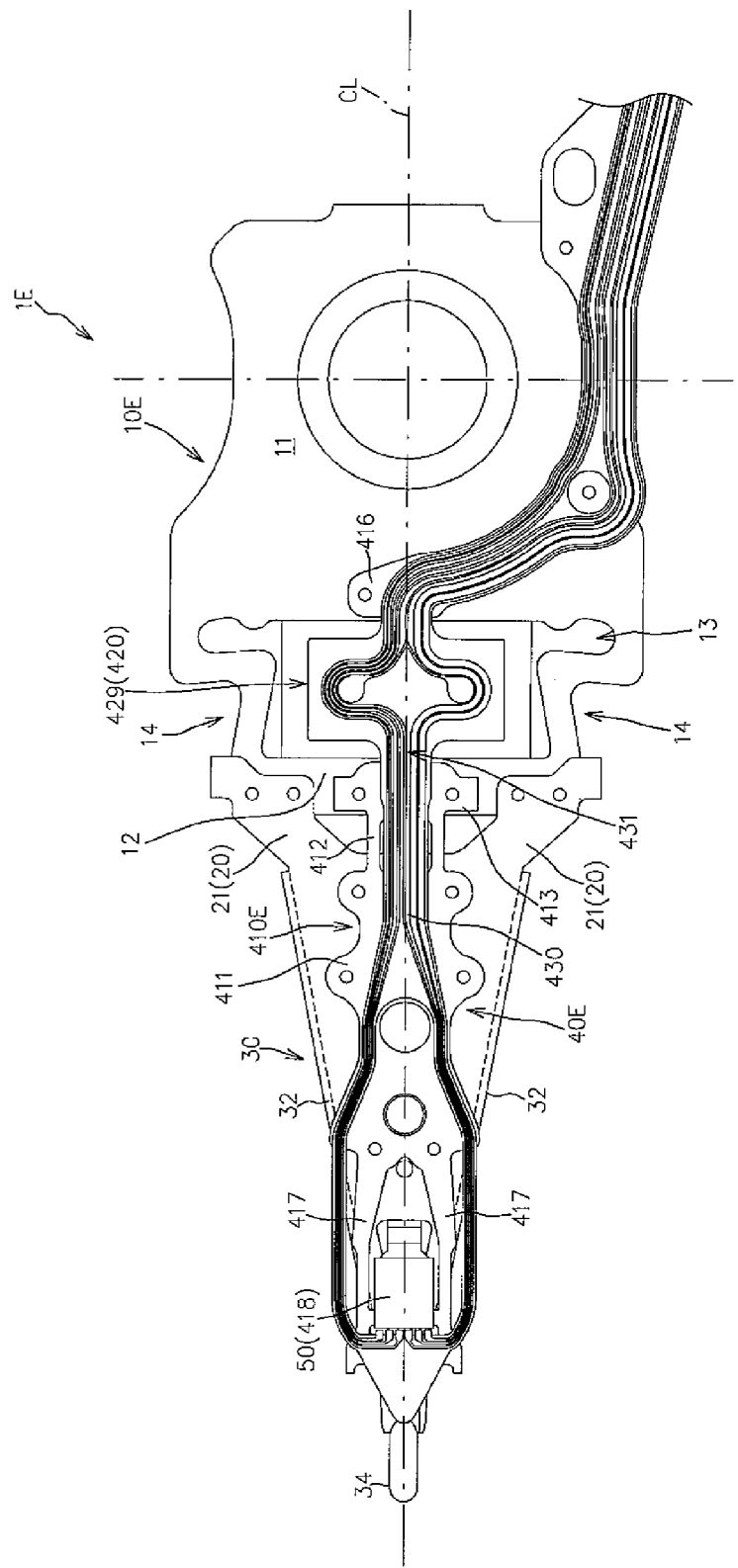
FIG. 15B is a bottom view of the magnetic head suspension according to the fifth embodiment.

FIGS. 15A and 15B are a top view (a plan view as viewed from a side opposite from the disk surface) and a bottom view (a bottom plan view as viewed from a side close to the disk surface) of a magnetic head suspension 1E according to the present embodiment, respectively. FIG. 15B indicates welding points (more specifically, welding points by laser beam spot welding) with using small circles.

Figure 17:
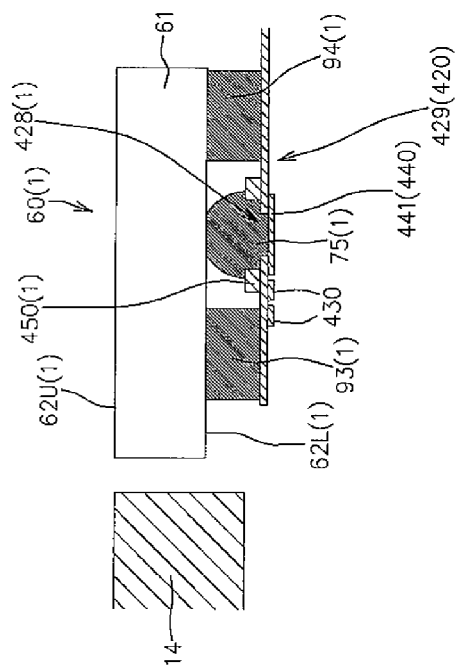
FIG. 17 is a cross sectional view taken along line XVII-XVII in FIG. 15A.

FIGS. 16 and 17 are cross sectional views taken along lines XVI-XVI and XVII-XVII in FIG. 15A, respectively.

In the figures, the members same as those in the first to fourth embodiments are denoted by the same reference numerals to omit the detailed description thereof.

In the embodiments explained earlier, the respective flexure metal plates 410, 410C, 410D of the flexure parts 40, 40C, 40D are configured so as to support the first and second piezoelectric elements 60(1), 60(2).

More specifically, in each of the embodiments explained earlier, each of the first and second piezoelectric elements 60(1), 60(2) has the lower surface that is fixed at the distal side to the distal-side support plate forming region 414 by the fixing distal side-insulative adhesive agents 73, 173 and is also fixed at the proximal side to the proximal-side support plate forming region 415 by the fixing proximal side-insulative adhesive agents 74, 174, in a state where the distal side-end surface and the proximal-side end surface of each of the piezoelectric elements are connected to the proximal side-end surface of the distal end section 12 and the distal side-end surface of the proximal end section 11 by the end surface side-insulative adhesive agents 71, respectively. The fixing distal side-insulative adhesive agents 73, 173 and the fixing proximal side-insulative adhesive agents 74, 174 form parts of the surrounding insulative adhesive agents 90, 190.

On the other hand, in the present embodiment, the first and second piezoelectric elements 60(1), 60(2) are supported substantially only by a supporting part 10E.

More specifically, the magnetic head suspension 1E includes a supporting part 10E and a flexure part 40E in place of the supporting part 10 and the flexure part 40, in comparison with the magnetic head suspension according to the first embodiment.

The supporting part 10E includes the components same as those of the supporting part 10, and further includes a distal-side cutout (or notch) 12*a* and a proximal-side cutout (or notch) 11*a*, as shown in FIG. 16 or the like. The distal-side cutout 12 *a* is formed in the distal end section 12 so as to be opened to the side opposite from the disk surface and the proximal side in the suspension longitudinal direction. The proximal-side cutout 11*a* is formed in the proximal end section 11 so as to be opened to the side opposite from the disk surface and the distal side in the suspension longitudinal direction.

Figure 18:
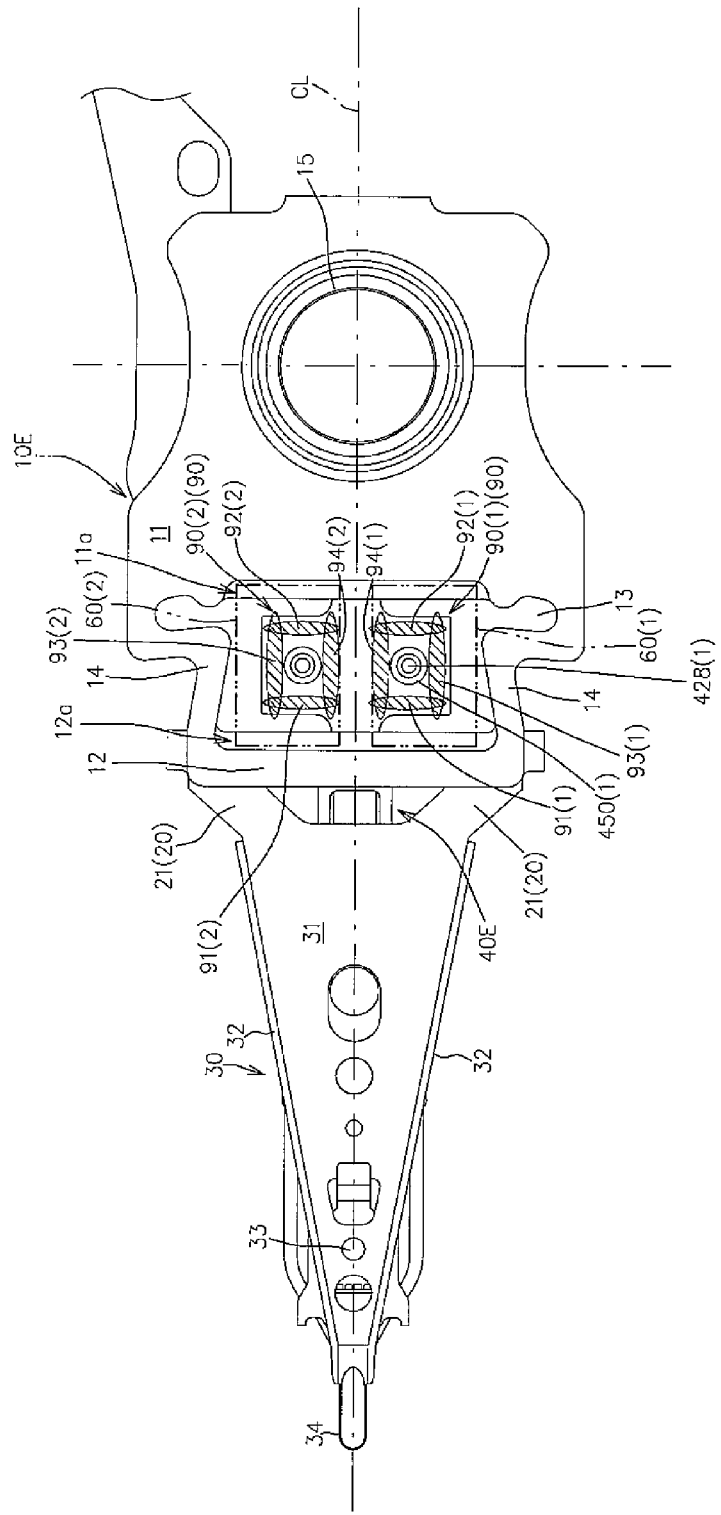
FIG. 18 is a top view of the magnetic head suspension according to the fifth embodiment in a state where the first and second piezoelectric elements have been removed.

FIG. 18 is a top view of the magnetic head suspension 1E in a state where the first and second piezoelectric elements 60(1), 60(2) have been removed. FIG. 18 shows the first and second piezoelectric elements 60(1), 60(2) with chain double-dashed line for the purpose of easier understanding.

As shown in FIGS. 16 and 18, the first and second piezoelectric elements 60(1), 60(2) are connected at the distal sides and the proximal sides to the distal-side cutout 12*a* and the proximal-side cutout 11*a* by fixing distal side-insulative adhesive agents 78, respectively, as shown in FIGS. 16 and 18.

More specifically, the distal sides of the first and second piezoelectric elements 60(1), 60(2) are connected to the distal-side cutout 12*a* through the fixing distal side-insulative adhesive agent 78 in a state where the lower surfaces of the elements that face the disk surface face the upper surface of the distal-side cutout 12*a* that faces upward and the end surfaces of the elements that face to the distal side face an end surface of the distal-side cutout 12*a* that faces to the proximal side.

The proximal sides of the first and second piezoelectric elements 60(1), 60(2) are connected to the proximal-side cutout 11*a* through the fixing distal side-insulative adhesive agent 78 in a state where the lower surfaces of the elements that face the disk surface face the upper surface of the proximal-side cutout 11*a* that faces upward and the end surfaces of the elements that face to the proximal side face an end surface of the proximal-side cutout 11*a* that faces to the distal side.

Figure 19:
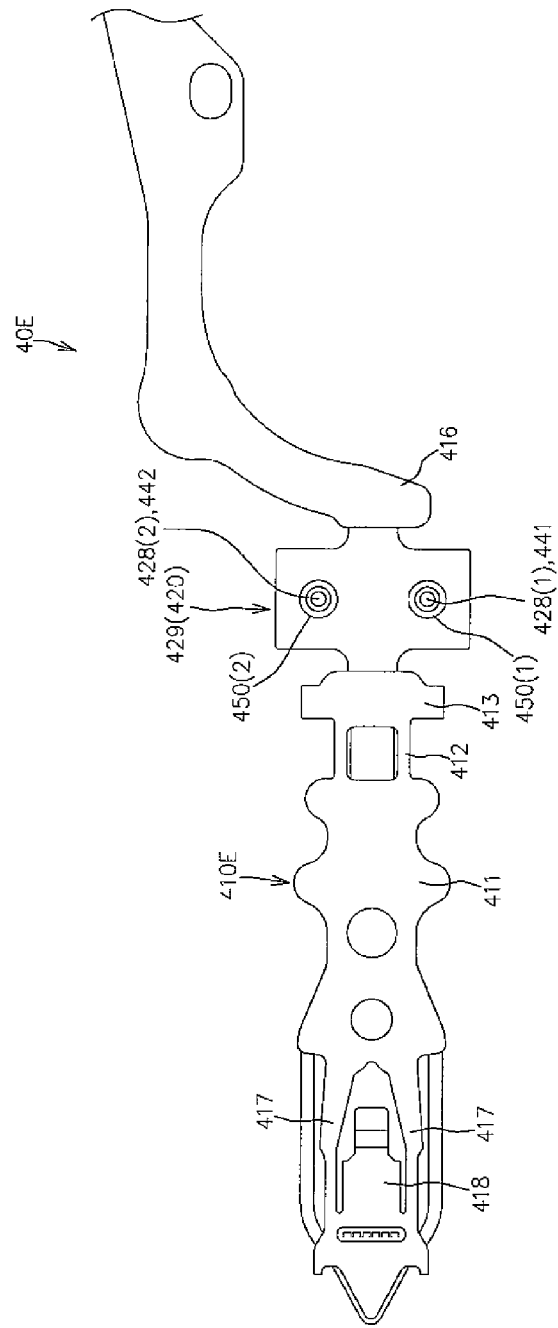
FIG. 19 is a top view of a flexure part of the magnetic head suspension according to the fifth embodiment.
Figure 20:
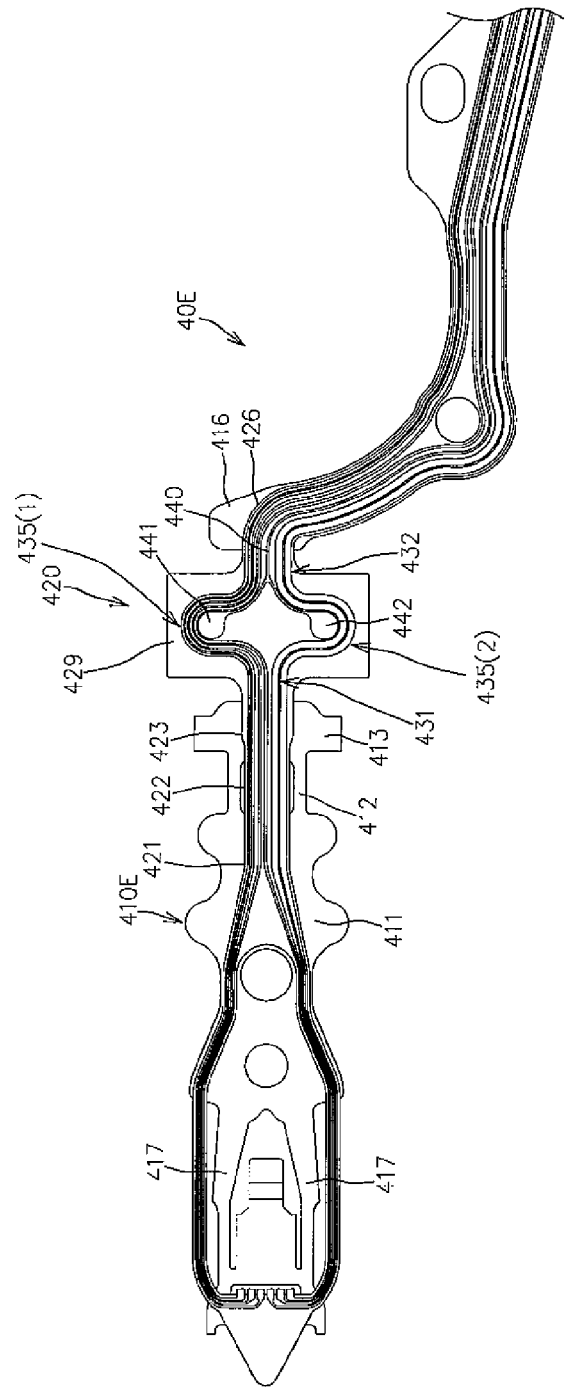
FIG. 20 is a bottom view of the flexure part shown in FIG. 19.

FIGS. 19 and 20 are a top view and a bottom view of the flexure part 40E, respectively.

The flexure part 40E is different from the flexure part 40 in that the flexure metal plate 410 is replaced by a flexure metal plate 410E.

As shown in FIGS. 19 and 20, the flexure metal plate 410E has a configuration in which the distal-side support plate forming region 414 and the proximal-side support plate forming region 415 are deleted from the flexure metal plate 410.

In the configuration, the surrounding insulative adhesive agent 90 are provided on the upper surface, which is opposite from the disk surface, of the connecting region 429 of the insulating layer 420 so as to surround the first and second lower conductive adhesive agents 75(1), 75(2) in a plan view.

In the present embodiment, the surrounding insulative adhesive agent 90 is configured so as to have the first and second surrounding insulative adhesive agents 90(1), 90(2) surrounding the first and second lower conductive adhesive agents 75(1), 75(2), respectively, as shown in FIG. 18 or the like. Alternatively, of course, the surrounding insulative adhesive agent 90 can be configured so as to surround both the first and second lower conductive adhesive agents 75(1), 75(2), as in the second embodiment.

What is claimed is:

1. A magnetic head suspension comprising a load bending part that generates a load for pressing a magnetic head slider toward a disk surface, a load beam part that transmits the load to the magnetic head slider, a supporting part that supports the load beam part via the load bending part and is swung about a swing center directly or indirectly by a main actuator, a flexure part that is supported by the load beam part and the supporting part while supporting the magnetic head slider, and paired right and left piezoelectric elements that are attached to the supporting part so as to be symmetrical with each other with respect to a suspension longitudinal center line and have expansion and contraction directions different from each other, in order to enable micro motion of the magnetic head slider in a seek direction, wherein the supporting part includes a proximal end section that is directly or indirectly connected to the main actuator, a distal end section to which the load bending part is connected, an open section that is positioned between the proximal end section and the distal end section in a suspension longitudinal direction, and paired right and left connecting beams that are positioned outward of the open section in a suspension width direction and connect the proximal end section and the distal end section, wherein each of the paired first and second piezoelectric elements has a piezoelectric main body, and an upper electrode layer and a lower electrode layer that face each other with the piezoelectric main body being interposed between them, each of the first and second piezoelectric elements having a distal portion and a proximal portion that are directly or indirectly connected to the distal end section and the proximal end section, respectively, in a state where it is at least partially positioned within the open section in a plan view as viewed along a direction orthogonal to the disk surface while the lower electrode layer facing the disk surface, wherein the flexure part includes a flexure metal plate fixed to lower surfaces of the load beam part and the supporting part that face the disk surface, an insulating layer laminated on a lower surface of the flexure metal plate that faces the disk surface, and a conductor layer laminated on a lower surface of the insulating layer that faces the disk surface, wherein the insulating layer includes first and second piezoelectric element overlapped portions that are positioned within the open section and are overlapped with the first and second piezoelectric elements, respectively, in a plan view as viewed along the direction orthogonal to the disk surface, wherein the conductor layer includes a signal wiring having a proximal end capable of being electrically connected to an outside and a distal end capable of being electrically connected to the magnetic head slider, and a voltage supply wiring having a proximal end capable of being electrically connected to an outside, wherein the first and second piezoelectric element overlapped portions are formed with first and second connecting openings, respectively, that extend between the lower surfaces facing the disk surface and the upper surfaces opposite from the disk surface, and wherein there are provided, on the upper surface of the insulating layer, first and second lower conductive adhesive agents that electrically connect the lower electrode layers of the first and second piezoelectric elements to the voltage supply wiring through the first and second connecting openings, and a surrounding insulative adhesive agent that is arranged so as to surround the first and second lower conductive adhesive agents in a plan view.

2. A magnetic head suspension according to claim 1, wherein the surrounding insulative adhesive agent includes first and second surrounding insulative adhesive agents that surround the first and second lower conductive adhesive agents in a plan view, respectively, wherein the first surrounding insulative adhesive agent includes a first surrounding distal-side insulative adhesive agent and a first surrounding proximal-side insulative adhesive agent that are disposed on a distal side and a proximal side from the first connecting opening in the suspension longitudinal direction, respectively, a first surrounding outer-side insulative adhesive agent that is disposed on an outer side from the first connecting opening in the suspension width direction and connects the first surrounding distal-side insulative adhesive agent and the first surrounding proximal-side insulative adhesive agent, and a first surrounding inner-side insulative adhesive agent that is disposed on an inner side from the first connecting opening in the suspension width direction and connects the first surrounding distal-side insulative adhesive agent and the first surrounding proximal-side insulative adhesive agent, and wherein the second surrounding insulative adhesive agent includes a second surrounding distal-side insulative adhesive agent and a second surrounding proximal-side insulative adhesive agent that are disposed on a distal side and a proximal side from the second connecting opening in the suspension longitudinal direction, respectively, a second surrounding outer-side insulative adhesive agent that is disposed on an outer side from the second connecting opening in the suspension width direction and connects the second surrounding distal-side insulative adhesive agent and the second surrounding proximal-side insulative adhesive agent, and a second surrounding inner-side insulative adhesive agent that is disposed on an inner side from the second connecting opening in the suspension width direction and connects the second surrounding distal-side insulative adhesive agent and the second surrounding proximal-side insulative adhesive agent.

3. A magnetic head suspension according to claim 2, wherein the first surrounding insulative adhesive agent is disposed so as to be overlapped with the first piezoelectric element in a plan view and seals a gap between the first lower electrode layer and the insulating layer in the direction orthogonal to the disk surface, and wherein the second surrounding insulative adhesive agent is disposed so as to be overlapped with the second piezoelectric element in a plan view and seals a gap between the second lower electrode layer and the insulating layer in the direction orthogonal to the disk surface.

4. A magnetic head suspension according to claim 1, further comprising first and second metal rings arranged on the upper surface of the insulating layer so as to surround the first and second connecting openings, respectively.

5. A magnetic head suspension according to claim 1, wherein the surrounding insulative adhesive agent includes a surrounding distal-side insulative adhesive agent and a surrounding proximal-side insulative adhesive agent that are disposed on a distal side and a proximal side from the first and second connecting openings in the suspension longitudinal direction, respectively, a surrounding first outer-side insulative adhesive agent that is disposed on one side from the first and second connecting openings in the suspension width direction and connects the surrounding distal-side insulative adhesive agent and the surrounding proximal-side insulative adhesive agent, and a surrounding second outer-side insulative adhesive agent that is disposed on the other side from the first and second connecting openings in the suspension width direction and connects the surrounding distal-side insulative adhesive agent and the surrounding proximal-side insulative adhesive agent.

6. A magnetic head suspension according to claim 5, wherein the surrounding distal-side insulative adhesive agent includes a distal-side first width direction portion and a distal-side second width direction portion that are overlapped with the first and second piezoelectric elements in a plan view, respectively, and a distal-side center portion that extends between the distal-side first and second width direction portions, wherein the surrounding proximal-side insulative adhesive agent includes a proximal-side first width direction portion and a proximal-side second width direction portion that are overlapped with the first and second piezoelectric elements in a plan view, respectively, and a proximal-side center portion that extends between the proximal-side first and second width direction portions, wherein the surrounding first outer-side insulative adhesive agent is overlapped with the first piezoelectric element in a plan view, wherein the surrounding second outer-side insulative adhesive agent is overlapped with the second piezoelectric element in a plan view, wherein the distal-side first width direction portion, the proximal-side first width direction portion and the surrounding first outer-side insulative adhesive agent close a gap between the first lower electrode layer and the insulating layer with respect to the direction orthogonal to the disk surface, and wherein the distal-side second width direction portion, the proximal-side second width direction portion and the surrounding second outer-side insulative adhesive agent close a gap between the second lower electrode layer and the insulating layer with respect to the direction orthogonal to the disk surface.

7. A magnetic head suspension according to claim 6, further comprising a sealing insulative adhesive agent with which first and second space are filled, the first space being defined by the first lower electrode layer, the insulating layer, the distal-side first width direction portion, the proximal-side first width direction portion and the surrounding first outer-side insulative adhesive agent, the second space being defined by the second lower electrode layer, the insulating layer, the distal-side second width direction portion, the proximal-side second width direction portion and the surrounding second outer-side insulative adhesive agent.

8. A magnetic head suspension according to claim 5, further comprising a metal ring arranged on the upper surface of the insulating layer so as to surround the first and second connecting openings separately or integrally.

9. A magnetic head suspension according to claim 1, wherein the distal end section is formed on the upper surface with a distal-side cutout so as to be opened to the side opposite from the disk surface and the proximal side in the suspension longitudinal direction, wherein the proximal end section is formed on the upper surface with a proximal-side cutout so as to be opened to the side opposite from the disk surface and the distal side in the suspension longitudinal direction, and wherein the first and second piezoelectric elements are connected at the distal sides and the proximal sides to the distal-side cutout and the proximal-side cutout by fixing distal side-insulative adhesive agents, respectively.

10. A magnetic head suspension according to claim 1, wherein the flexure metal plate includes a load beam part-overlapped region that is fixed to the lower surface of the load beam part while being overlapped therewith, a supporting part-distal side-overlapped region that is fixed to the lower surface of the distal end section while being overlapped therewith, a load bending part-corresponding part that is positioned between paired leaf springs forming the load bending part in the suspension width direction and connects the load beam part-overlapped region and the supporting part-distal side-overlapped region, a supporting part-proximal side-overlapped region that is fixed to the lower surface of the proximal end section while being overlapped therewith, a distal-side support plate forming region that extends from the supporting part-distal side-overlapped region so as to be positioned within the open section, and a proximal-side support plate forming region that extends from the supporting part-proximal side-overlapped region so as to be positioned within the open section in a state of being away from the distal-side support plate forming region in the suspension longitudinal direction, wherein the distal-side support plate forming region includes a distal-side center portion that extends from the supporting part-distal side-overlapped region toward the proximal side in the suspension longitudinal direction, and distal-side first and second width direction portions that extend from the distal-side center portion toward one side and the other side in the suspension width direction, respectively, wherein the proximal-side support plate forming region includes a proximal-side center portion that extends from the supporting part-proximal side-overlapped region toward the distal side in the suspension longitudinal direction, and proximal-side first and second width direction portions that extend from the proximal-side center portion toward one side and the other side in the suspension width direction, respectively, wherein the insulating layer includes a load beam part-corresponding region, a load bending part-corresponding region, a supporting part-distal side-corresponding region and a supporting part-proximal side-corresponding region that are laminated on the lower surfaces of the load beam part-overlapped region, the load bending part-corresponding part, the supporting part-distal side-overlapped region and the supporting part-proximal side-overlapped region of the flexure metal plate, respectively, and further includes a connecting region that is positioned within the open section so as to connect the supporting part-distal side-corresponding region and the supporting part-proximal side-corresponding region, wherein the connecting region includes a distal-side support plate overlapped portion and a proximal-side support plate overlapped portion that are respectively laminated on the lower surfaces of the distal-side support plate forming region and the proximal-side support plate forming region, and the first and second piezoelectric element overlapped portions that are positioned between the distal-side support plate overlapped portion and the proximal-side support plate overlapped portion in the suspension longitudinal direction, wherein the first piezoelectric element has a distal side-end surface and a proximal-side end surface that face a proximal side-end surface of the distal end section and a distal side-end surface of the proximal end section, respectively, with end surface side-insulative adhesive agents being interposed between them, and the lower surface of the first piezoelectric element that faces the disk surface includes a distal side that is fixed to the distal-side first width direction portion by a first fixing distal side-insulative adhesive agent and a proximal side that is fixed to the proximal-side first width direction portion by a first fixing proximal side-insulative adhesive agent, wherein the second piezoelectric element has a distal side-end surface and a proximal-side end surface that face the proximal side-end surface of the distal end section and the distal side-end surface of the proximal end section, respectively, with the end surface side-insulative adhesive agents being interposed between them, and the lower surface of the second piezoelectric element that faces the disk surface includes a distal side that is fixed to the distal-side second width direction portion by a second fixing distal side-insulative adhesive agent and a proximal side that is fixed to the proximal-side second width direction portion by a second fixing proximal side-insulative adhesive agent, wherein the first and second fixing distal side-insulative adhesive agents function as an insulative adhesive agent of the surrounding insulative adhesive agent that are positioned on a distal side in the suspension longitudinal direction from the first and second connecting openings, and wherein the first and second fixing proximal side-insulative adhesive agents function as an insulative adhesive agent of the surrounding insulative adhesive agent that are positioned on a proximal side in the suspension longitudinal direction from the first and second connecting openings.

11. A magnetic head suspension according to claim 10, wherein there is provided a gap between distal edges of the distal-side first and second width direction portions and a proximal edge of the distal end section, and wherein there is provided a gap between proximal edges of the proximal-side first and second width direction portions and a distal edge of the proximal end section.

12. A magnetic head suspension according to claim 10, wherein the flexure metal plate includes a first distal-side extending piece, a second distal-side extending piece, a first proximal-side extending piece and a second proximal-side extending piece, the first distal-side extending piece being disposed outward of the first connecting opening in the suspension width direction and extending from the distal-side support plate forming region toward the proximal side in the suspension longitudinal direction so as to overlap with the first piezoelectric element in a plan view, the second distal-side extending piece being disposed outward of the second connecting opening in the suspension width direction and extending from the distal-side support plate forming region toward the proximal side in the suspension longitudinal direction so as to overlap with the second piezoelectric element in a plan view, the first proximal-side extending piece being disposed at a substantially same position as the first distal-side extending piece with respect to the suspension width direction and extending toward the distal side in the suspension longitudinal direction from the proximal-side support plate forming region so as to overlap with the first piezoelectric element in a plan view, the second proximal-side extending piece being disposed at a substantially same position as the second distal-side extending piece with respect to the suspension width direction and extending toward the distal side in the suspension longitudinal direction from the proximal-side support plate forming region so as to overlap with the second piezoelectric element in a plan view, wherein the first distal-side extending piece and the first proximal-side extending piece are separate from each other, and the second distal-side extending piece and the second proximal-side extending piece are separate from each other, and wherein an insulative adhesive agent of the surrounding insulative adhesive agent that is positioned outward of the first connecting opening in the suspension width direction and extends in the suspension longitudinal direction is provided on the upper surfaces of the first distal-side extending piece and the first proximal-side extending piece, and an insulative adhesive agent of the surrounding insulative adhesive agent that is positioned outward of the second connecting opening in the suspension width direction and extends in the suspension longitudinal direction is provided on the upper surfaces of the second distal-side extending piece and the second proximal-side extending piece.

13. A magnetic head suspension according to claim 10, wherein the flexure metal plate includes a first connecting piece and a second connecting piece, the first connecting piece connecting the distal-side support plate forming region and the proximal-side support plate forming region in a state of being disposed outward of the first connecting opening in the suspension width direction and overlapped with the first piezoelectric element in a plan view, the second connecting piece connecting the distal-side support plate forming region and the proximal-side support plate forming region in a state of being disposed outward of the second connecting opening in the suspension width direction and overlapped with the second piezoelectric element in a plan view, and wherein the first and second connecting pieces are provided with elastic portions capable of being elastically deformed in the suspension longitudinal direction.

14. A magnetic head suspension according to claim 10, wherein the supporting part-distal side-overlapped region and the distal-side support plate forming region are formed with an opening that is across the proximal edge of the distal end section, and the supporting part-proximal side-overlapped region and the proximal-side support plate forming region are formed with an opening that is across the distal edge of the proximal end section.

15. A magnetic head suspension comprising a load bending part that generates a load for pressing a magnetic head slider toward a disk surface, a load beam part that transmits the load to the magnetic head slider, a supporting part that supports the load beam part via the load bending part and is swung about a swing center directly or indirectly by a main actuator, a flexure part that is supported by the load beam part and the supporting part while supporting the magnetic head slider, and paired right and left piezoelectric elements that are attached to the supporting part so as to be symmetrical with each other with respect to a suspension longitudinal center line and have expansion and contraction directions different from each other, in order to enable micro motion of the magnetic head slider in a seek direction, wherein the supporting part includes a proximal end section that is directly or indirectly connected to the main actuator, a distal end section to which the load bending part is connected, an open section that is positioned between the proximal end section and the distal end section in a suspension longitudinal direction, and paired right and left connecting beams that are positioned outward of the open section in a suspension width direction and connect the proximal end section and the distal end section, wherein each of the paired first and second piezoelectric elements has a piezoelectric main body, and an upper electrode layer and a lower electrode layer that face each other with the piezoelectric main body being interposed between them, each of the first and second piezoelectric elements having a distal portion and a proximal portion that are directly or indirectly connected to the distal end section and the proximal end section, respectively, in a state where it is at least partially positioned within the open section in a plan view as viewed along a direction orthogonal to the disk surface while the lower electrode layer facing the disk surface, wherein the flexure part includes a flexure metal plate fixed to lower surfaces of the load beam part and the supporting part that face the disk surface, an insulating layer laminated on a lower surface of the flexure metal plate that faces the disk surface, and a conductor layer laminated on a lower surface of the insulating layer that faces the disk surface, wherein the insulating layer includes first and second piezoelectric element overlapped portions that are positioned within the open section and are overlapped with the first and second piezoelectric elements, respectively, in a plan view as viewed along the direction orthogonal to the disk surface, wherein the conductor layer includes a signal wiring having a proximal end capable of being electrically connected to an outside and a distal end capable of being electrically connected to the magnetic head slider, and a voltage supply wiring having a proximal end capable of being electrically connected to an outside, wherein the first and second piezoelectric element overlapped portions are formed with first and second connecting openings, respectively, that extend between the lower surfaces facing the disk surface and the upper surfaces opposite from the disk surface, wherein the magnetic head suspension further comprises a single metal ring arranged on the upper surface of the insulating layer that is opposite from the disk surface so as to surround the first and second connecting openings in a plan view, wherein the lower electrode layers of the first and second piezoelectric elements are electrically connected to the supply voltage wiring through a lower conductive adhesive agent provided within the metal ring on the upper surface of the insulating layer, and wherein the magnetic head suspension further comprises a surrounding insulative adhesive agent that is arranged directly or indirectly on the upper surface of the insulating layer so as to surround the metal ring in a plan view.

* * * * *